(12) United States Patent
Banning et al.

(10) Patent No.: US 7,414,406 B2
(45) Date of Patent: Aug. 19, 2008

(54) SYSTEM AND METHOD FOR LOCATING AN ANOMALY

(75) Inventors: Erik Banning, Houston, TX (US);
Teruhiko Hagiwara, Houston, TX (US);
Rich Ostermeier, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/270,094

(22) Filed: Nov. 9, 2005

(65) Prior Publication Data

US 2006/0055411 A1    Mar. 16, 2006

Related U.S. Application Data

(62) Division of application No. 10/701,735, filed on Nov. 5, 2003.

(51) Int. Cl.
*G01V 3/18* (2006.01)
(52) U.S. Cl. ...................................................... 324/338
(58) Field of Classification Search ................. 324/338
See application file for complete search history.

(56) References Cited

U.S. PATENT DOCUMENTS

| | | | |
|---|---|---|---|
| 3,090,910 A | 5/1963 | Moran | 324/6 |
| 3,993,944 A | 11/1976 | Meador et al. | 324/6 |
| 4,372,398 A | 2/1983 | Kuckes | 175/45 |
| 4,849,699 A | 7/1989 | Gill et al. | 324/339 |
| 4,933,640 A | 6/1990 | Kuckes | 324/339 |
| 5,241,273 A | 8/1993 | Luling | 324/338 |
| 5,678,643 A | 10/1997 | Robbins et al. | 175/45 |
| 5,757,191 A | 5/1998 | Gianzero | 324/339 |
| 5,955,884 A | 9/1999 | Payton et al. | 324/339 |
| 5,966,013 A | 10/1999 | Hagiwara | 324/339 |
| 6,044,325 A | 3/2000 | Chakravarthy et al. | 702/7 |
| 6,181,138 B1 | 1/2001 | Hagiwara et al. | 324/338 |
| 6,952,101 B2 * | 10/2005 | Gupta | 324/339 |

(Continued)

FOREIGN PATENT DOCUMENTS

GB    2301902    12/1996

(Continued)

OTHER PUBLICATIONS

Ward. S.H. and Hohmann, G. W. "Electromagnetic Methods in Applied Geophysics Theory" vol. 1, 1998 pp. 167-183: 203-237, Society of Exploration Geophysics.

(Continued)

*Primary Examiner*—Reena Aurora

(57) ABSTRACT

A method and a system are provided for allowing determination of a direction and distance from a tool to anomaly in a formation. The apparatus for performing the method includes at least one transmitter and at least one receiver. An embodiment of the method includes transmitting electromagnetic signals from the at least one transmitter through the formation near the wellbore and detecting responses at the at least one receiver induced by the electromagnetic signals. The method may further include determining the direction from the device to the anomaly based on the detected responses. The method may also include calculating at least one of an apparent azimuth angle and an apparent dip angle based on the responses, monitoring the at least one calculated apparent angle over time, and determining the direction to the anomaly after the at least one monitored apparent angle deviates from a zero value.

17 Claims, 19 Drawing Sheets

U.S. PATENT DOCUMENTS

| | | | |
|---|---|---|---|
| 2003/0038634 A1 | 2/2003 | Strack | 324/323 |
| 2004/0140091 A1 | 7/2004 | Gupta | 166/254.1 |
| 2005/0092487 A1 | 5/2005 | Banning et al. | 166/254.1 |

FOREIGN PATENT DOCUMENTS

| | | |
|---|---|---|
| WO | 03/019237 | 3/2003 |
| WO | 2005/047934 | 5/2005 |

OTHER PUBLICATIONS

Moran, J.H. and Kunz, K.S., "Basic Theory of Induction Logging and Application to Study of Two-Coil Sondes". Dec. 1962. pp. 829-858, Geohysics, vol. XXVII, No. 6, Part I (Presented at the 28th Annual SEG Meeting, Oct. 14, 1958. San Antonio, Texas), p. 828-858.

Stolarczyk, L.G., et al. "Electromganetic Seam Wave Mappping of Roof Rock Conditions Across a Longwall Panel", 18th Intl Conf on Ground Control in Mining, Aug. 3, 1999-Aug. 5, 1999, pp. 1-5.

International Search Report dated Sep. 22, 2005, international application PCT/US2005/015716.

Written Opinion of the International Searching Authority mailed Oct. 12, 2005. international application PCT/US2005/015716.

International Search Report dated Mar. 22, 2005. international application PCT/US2004/036803.

Written Opinion of the International Searching Authority mailed Sep. 23, 2005, international application PCT/US2004/036803.

International Preliminary Reported mailed Sep. 19, 2005, international application PCT/US2004/036803.

International Search Report dated Sep. 15, 2005, international application PCT/US2005/015709.

Written Opinion of the International Searching Authority mailed Sep. 23, 2005, international application PCT/US2005/015709.

Office Action mailed May 29, 2007 in U.S. Appl. No. 10/897,585.

Office Action mailed Jun. 12, 2007 in U.S. Appl. No. 10/270,707.

* cited by examiner

US 7,414,406 B2

SYSTEM AND METHOD FOR LOCATING AN ANOMALY

CROSS-REFERENCE TO RELATED APPLICATION

This is a divisional application of application Ser. No. 10/701,735, filed 5 Nov. 2003, which is hereby incorporated by reference.

FIELD OF THE INVENTION

The present invention relates to a method and system for locating an anomaly and in particular to finding the direction and distance to a resistive or conductive anomaly in a formation surrounding a borehole in drilling applications.

BACKGROUND OF THE INVENTION

In logging while drilling (LWD) geo-steering applications, it is advantageous to detect the presence of a formation anomaly ahead of or around a bit or bottom hole assembly. While currently available techniques are capable of detecting the presence of an anomaly, they are not capable of determining the location of the anomaly with sufficient depth or speed.

In formation evaluation, the depth of investigation of most logging tools, wire line or LWD has been limited to a few feet from the borehole. One such tool is disclosed in U.S. Pat. No. 5,678,643 to Robbins, et al. U.S. Pat. No. 5,678,643 to Robbins, et al. discloses an LWD tool for locating an anomaly. The tool transmits acoustic signals into a wellbore and receives returning acoustic signals including reflections and refractions. Receivers detect the returning acoustic signals and the time between transmission and receipt can be measured Distances and directions to detected anomalies are determined by a microprocessor that processes the time delay information from the receivers. As set forth above, the depth of investigation facilitated by the tool is limited.

Another technique that provides limited depth of investigation is disclosed in U.S. Pat. No. 6,181,138 to Hagiwara. This technique for locating an anomaly utilizes tilted coil induction tools and frequency domain excitation techniques. In order to achieve a depth of investigation with such a tool, a longer tool size would be required. However, longer tools generally result in poor spatial resolution.

In order to increase depth capabilities, transient electromagnetic (EM) methods have been proposed. One such method for increasing the depth of investigation is proposed in U.S. Pat. No. 5,955,884 to Payton, et al. The tool disclosed in this patent utilizes electric and electromagnetic transmitters to apply electromagnetic energy to a formation at selected frequencies and waveforms that maximize radial depth of penetration into the target formation. In this transient EM method, the current is generally terminated at a transmitter antenna and temporal change of voltage induced in a receiver antenna is monitored. This technique has allowed detection of an anomaly at distances as deep as ten to one hundred meters. However, while Payton discloses a transient EM method enabling detection of an anomaly, it does not provide a technique for determining the direction of the anomaly.

Other references, such as PCT application WO/03/019237 also disclose the use of directional resistivity measurements in logging applications. This reference uses the measurements for generating an image of an earth formation after measuring the acoustic velocity of the formation and combining the results. This reference does not disclose a specific method for determining distance and direction to an anomaly.

When logging measurements are used for well placement, detection or identification of anomalies can be critical. Such anomalies may include for example, a fault, a bypassed reservoir, a salt dome, or an adjacent bed or oil-water contact. It would be beneficial to determine both the distance and the direction of the anomaly from the drilling site.

Tri-axial induction logging devices, including wire-line and LWD devices are capable of providing directional resistivity measurements. However, no method has been proposed for utilizing these directional resistivity measurements to identify the direction to an anomaly.

Accordingly, a new solution is needed for determining the direction and distance from a tool to an anomaly. Furthermore, a real time solution having an increased depth of analysis is needed so that the measurements can be immediately useful to equipment operators.

SUMMARY OF THE INVENTION

In one aspect, an embodiment of the present invention is directed to a method for determining a direction to an anomaly in a formation near a wellbore. The method is implemented using a device including at least one transmitter and at least one receiver. The method includes transmitting electromagnetic signals from the transmitter through the formation near the wellbore and detecting responses at the receiver induced by the electromagnetic signals. The method additionally includes determining the direction and distance from the device to the anomaly based on the detected responses.

In a further aspect, a method for determining a direction and distance to an anomaly in a formation near a wellbore is provided. The method is accomplished using a device with at least one transmitter for transmitting electromagnetic signals and at least one receiver for detecting responses. The method includes calculating at least one of an apparent azimuth angle and an apparent dip angle based on the responses and monitoring the at least one calculated apparent angle over time. The method additionally includes determining the direction to the anomaly after the at least one monitored apparent angle deviates from a zero value.

In yet another aspect, an embodiment of the invention provides a method for determining a direction and distance to an anomaly in a formation near a wellbore. The method is implemented using a device including at least one transmitter for transmitting electromagnetic signals and a receiver for detecting responses. The method includes calculating at least one of an apparent azimuth angle and an apparent dip angle based on the responses and monitoring the at least one calculated apparent angle over time. The method additionally includes measuring the distance to the anomaly when the at least one monitored apparent angle reaches an asymptotic value.

In another embodiment, the invention provides a computer readable medium for storing computer executable instructions for performing a method for determining a direction to an anomaly in a system comprising a device with at least one transmitter for transmitting electromagnetic signals and a receiver for detecting responses. The method comprises calculating at least one of an apparent azimuth angle and an apparent dip angle based on the responses, monitoring the at least one calculated apparent angle over time, and determining the direction to the anomaly when the at least one monitored apparent angle reaches an asymptotic value.

In another embodiment, the invention provides a system for determining a direction to an anomaly in a formation near a wellbore. The system comprises at least one transmitter for transmitting electromagnetic signals through the formation near the wellbore, at least one receiver for detecting responses induced by the electromagnetic signal, and a computer readable medium storing instructions for determining the direction from the device to the anomaly based on the detected responses.

In another embodiment, the invention provides a computer readable medium for storing computer executable instructions for performing a method for determining a direction to an anomaly in a system comprising a device with at least one transmitter for transmitting electromagnetic signals and a receiver for detecting responses. The method comprises calculating at least one of an apparent azimuth angle and an apparent dip angle based on the responses, monitoring the at least one calculated apparent angle over time, and determining the direction to the anomaly after the at least one monitored apparent angle deviates from a zero value.

In another embodiment, the invention provides a method for locating an anomaly in relation to a logging tool including at least one transmitter and at least one receiver in a formation near a wellbore. The method comprises measuring a voltage response over time at the at least one receiver, calculating an apparent conductivity over time based on the voltage response, and locating the anomaly based on variation of the apparent conductivity over time.

In another embodiment, the invention provides a method for locating an anomaly in relation to a logging tool including at least one transmitter and at least one receiver in a formation near a wellbore. The method comprises calculating an apparent conductivity over a selected time span based on the voltage response, determining a time at which the apparent conductivity deviates from a constant value, and ascertaining the anomaly in a region specified by the determined time.

BRIEF DESCRIPTION OF THE DRAWINGS

The present invention is described in detail below with reference to the attached drawing figures, wherein.

DETAILED DESCRIPTION OF THE INVENTION

Embodiments of the invention relate to a system and method for determining distance and direction to an anomaly in a formation within a wellbore. Both frequency domain excitation and time domain excitation have been used to excite electromagnetic fields for use in anomaly detection. In frequency domain excitation, a device transmits a continuous wave of a fixed or mixed frequency and measures responses at the same band of frequencies. In time domain excitation, a device transmits a square wave signal, triangular wave signal, pulsed signal or pseudo-random binary sequence as a source and measures the broadband earth response. Sudden changes in transmitter current cause signals to appear at a receiver caused by induction currents in the formation. The signals that appear at the receiver are called transient responses because the receiver signals start at a first value and then decay or increase with time to a constant level. The technique disclosed herein implements the time domain excitation technique.

As set forth below, embodiments of the invention propose a general method to determine a direction to a resistive or conductive anomaly using transient EM responses. As will be explained in detail, the direction to the anomaly is specified by a dip angle and an azimuth angle. Embodiments of the invention propose to define an apparent dip θapp(t) and an apparent azimuth φapp(t) by combinations of tri-axial transient measurements. An apparent direction {θapp(t), φapp(t)} approaches a true direction {θ, φ} as a time increases. The θapp(t) and φapp(t) both initially read zero when an apparent conductivity σcoaxial(t) and σcoplanar(t) from coaxial and coplanar measurements both read the conductivity around the tool. The apparent conductivity will be further explained below and can also be used to determine the location of an anomaly in a wellbore.

Figure 1:
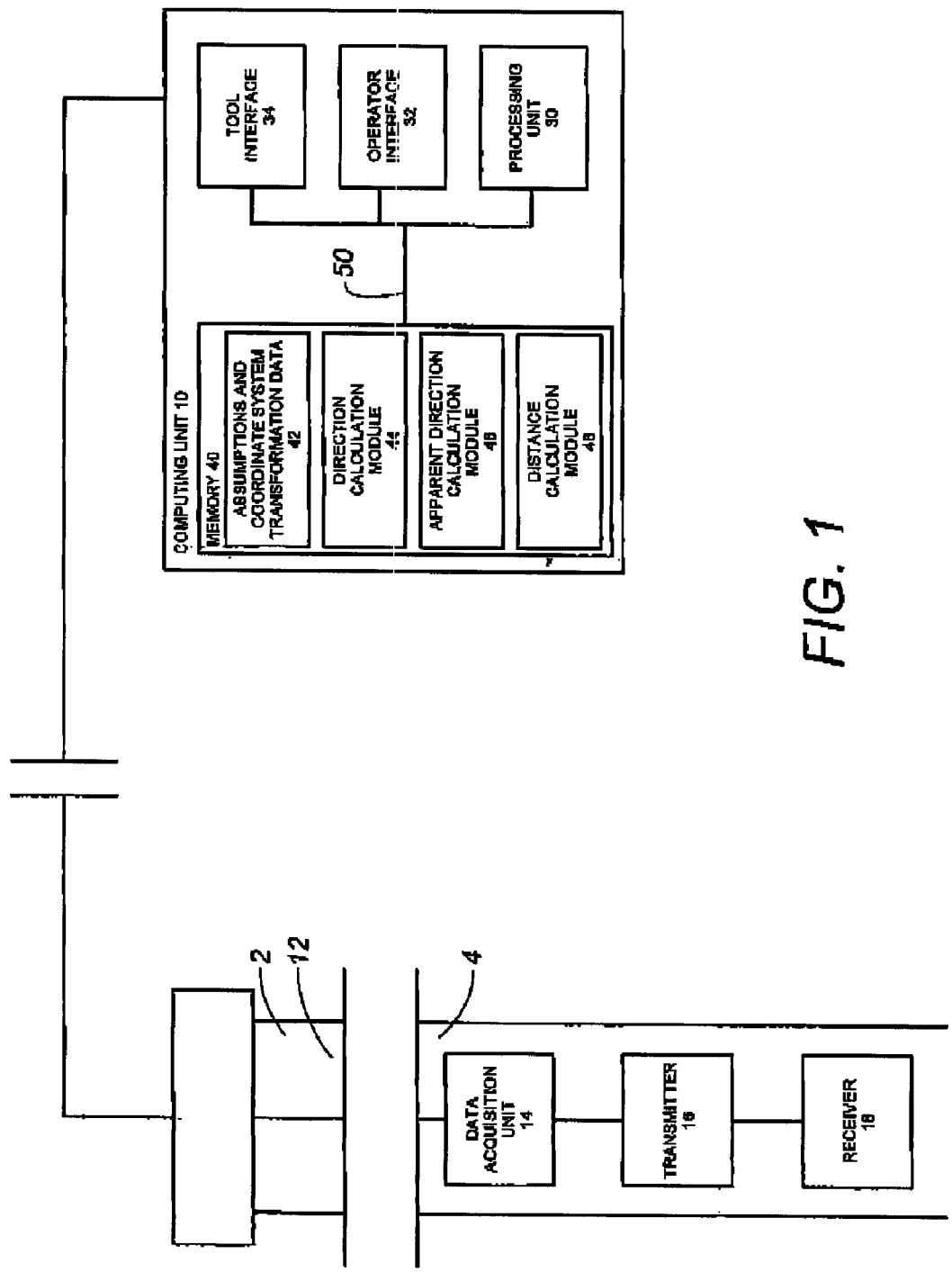
FIG. 1 is a block diagram showing a system in accordance with embodiment of the invention.

FIG. 1 illustrates a system that may be used to implement the embodiments of the method of the invention. A surface computing unit 10 may be connected with an electromagnetic measurement tool 2 disposed in a wellbore 4 and supported by a cable 12. The cable 12 may be constructed of any known type of cable for transmitting electrical signals between the tool 2 and the surface computing unit 10. One or more transmitters 16 and one are more receivers 18 may be provided for transmitting and receiving signals. A data acquisition unit 14 may be provided to transmit data to and from the transmitters 16 and receivers 18 to the surface computing unit 10.

Each transmitter 16 and each receiver 18 may be tri-axial and thereby contain components for sending and receiving signals along each of three axes. Accordingly, each transmitter module may contain at least one single or multi-axis antenna and may be a 3-orthogonal component transmitter. Each receiver may include at least one single or multi-axis electromagnetic receiving component and may be a 3-orthogonal component transmitter.

The data acquisition unit 14 may include a controller for controlling the operation of the tool 2. The data acquisition unit 14 preferably collects data from each transmitter 16 and receiver 18 and provides the data to the surface computing unit 10.

The surface computing unit 10 may include computer components including a processing unit 30, an operator interface 32, and a tool interface 34. The surface computing unit 10 may also include a memory 40 including relevant coordinate system transformation data and assumptions 42, a direction calculation module 44, an apparent direction calculation module 46, and a distance calculation module 48. The surface computing unit 10 may further include a bus 50 that couples various system components including the system memory 40 to the processing unit 30. The computing system environment 10 is only one example of a suitable computing environment and is not intended to suggest any limitation as to the scope of use or functionality of the invention. Furthermore, although the computing system 10 is described as a computing unit located on a surface, it may optionally be located below the surface, incorporated in the tool, positioned at a remote location, or positioned at any other convenient location.

The memory 40 preferably stores the modules 44, 46, and 48, which may be described as program modules containing computer-executable instructions, executed by the surface computing unit 10. The program module 44 contains the computer executable instruction necessary to calculate a direction to an anomaly within a wellbore. The program module 46 includes the computer executable instructions necessary to calculate an apparent direction as will be further explained below. The program module 48 contains the computer executable instructions necessary to calculate a distance to an anomaly. The stored data 46 includes data pertaining to the tool coordinate system and the anomaly coordinate system and other data required for use by the program modules 44, 46, and 48. These program modules 44, 46, and 48, as well as the stored data 42, will be further described below in conjunction with embodiments of the method of the invention.

Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Although the computing system 10 is shown as having a generalized memory 40, the computing system 10 would typically includes a variety of computer readable media. By way of example, and not limitation, computer readable media may comprise computer storage media and communication media The computing system memory 40 may include computer storage media in the form of volatile and/or nonvolatile memory such as a read only memory (ROM) and random access memory (RAM). A basic input/output system (BIOS), containing the basic routines that help to transfer information between elements within computer 10, such as during start-up, is typically stored in ROM. The RAM typically contains data and/or program modules that are immediately accessible to and/or presently being operated on by processing unit 30. By way of example, and not limitation, the computing system 10 includes an operating system, application programs, other program modules, and program data.

The components shown in the memory 40 may also be included in other removable/nonremovable, volatile/nonvolatile computer storage media For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media discussed above and illustrated in FIG. 1, provide storage of computer readable instructions, data structures, program modules and other data for the computing system 10.

A user may enter commands and information into the computing system 10 through input devices such as a keyboard and pointing device, commonly referred to as a mouse, trackball or touch pad. Input devices may include a microphone, joystick, satellite dish, scanner, or the like. These and other input devices are often connected to the processing unit 30 through the operator interface 32 that is coupled to the system bus 50, but may be connected by other interface and bus structures, such as a parallel port or a universal serial bus (USB). A monitor or other type of display device may be connected to the system bus 50 via an interface, such as a video interface. In addition to the monitor, computers may also include other peripheral output devices such as speakers and printer, which may be connected through an output peripheral interface.

Although many other internal components of the computing system 10 are not shown, those of ordinary skill in the art will appreciate that such components and the interconnection are well known. Accordingly, additional details concerning the internal construction of the computer 10 need not be disclosed in connection with the present invention.

Figure 2:
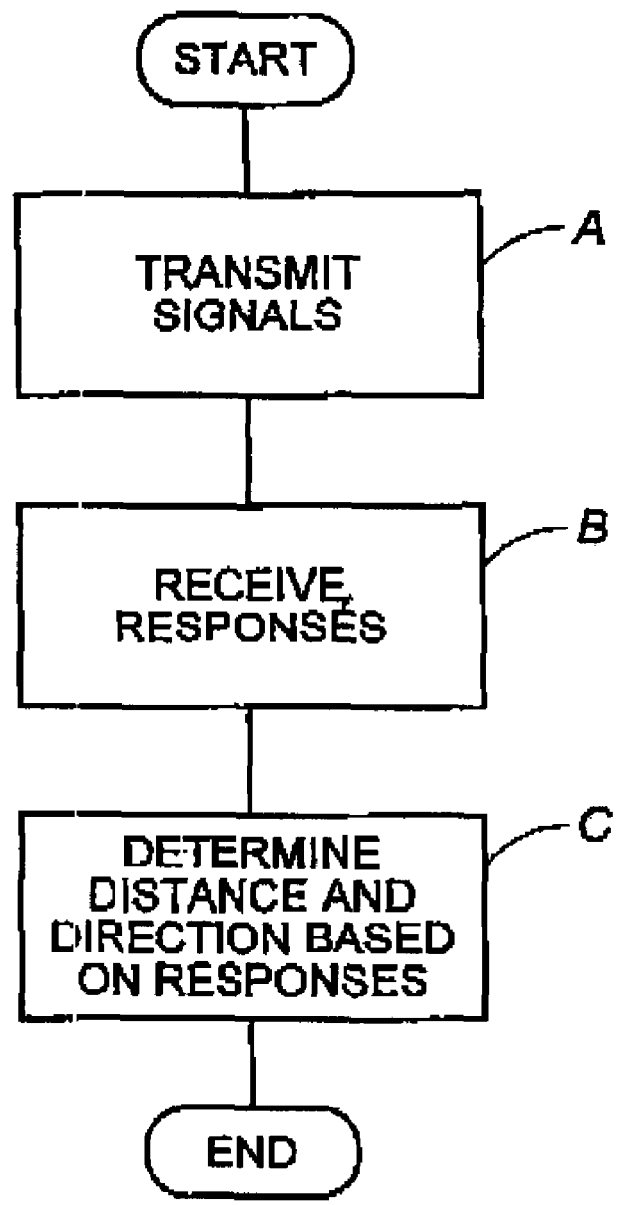
FIG. 2 is a flow chart illustrating a method in accordance with an embodiment of the invention.

FIG. 2 is a flow chart illustrating the procedures involved in a method of the invention. Generally, in procedure A, the transmitters 16 transmit electromagnetic signals. In procedure B, the receivers 18 receive transient responses. In procedure C, the system processes the transient responses to determine a distance and direction to the anomaly.

FIGS. 3-6 illustrate the technique for implementing procedure C for determining distance and direction to the anomaly.

Tri-axial Transient EM Responses

Figure 3:
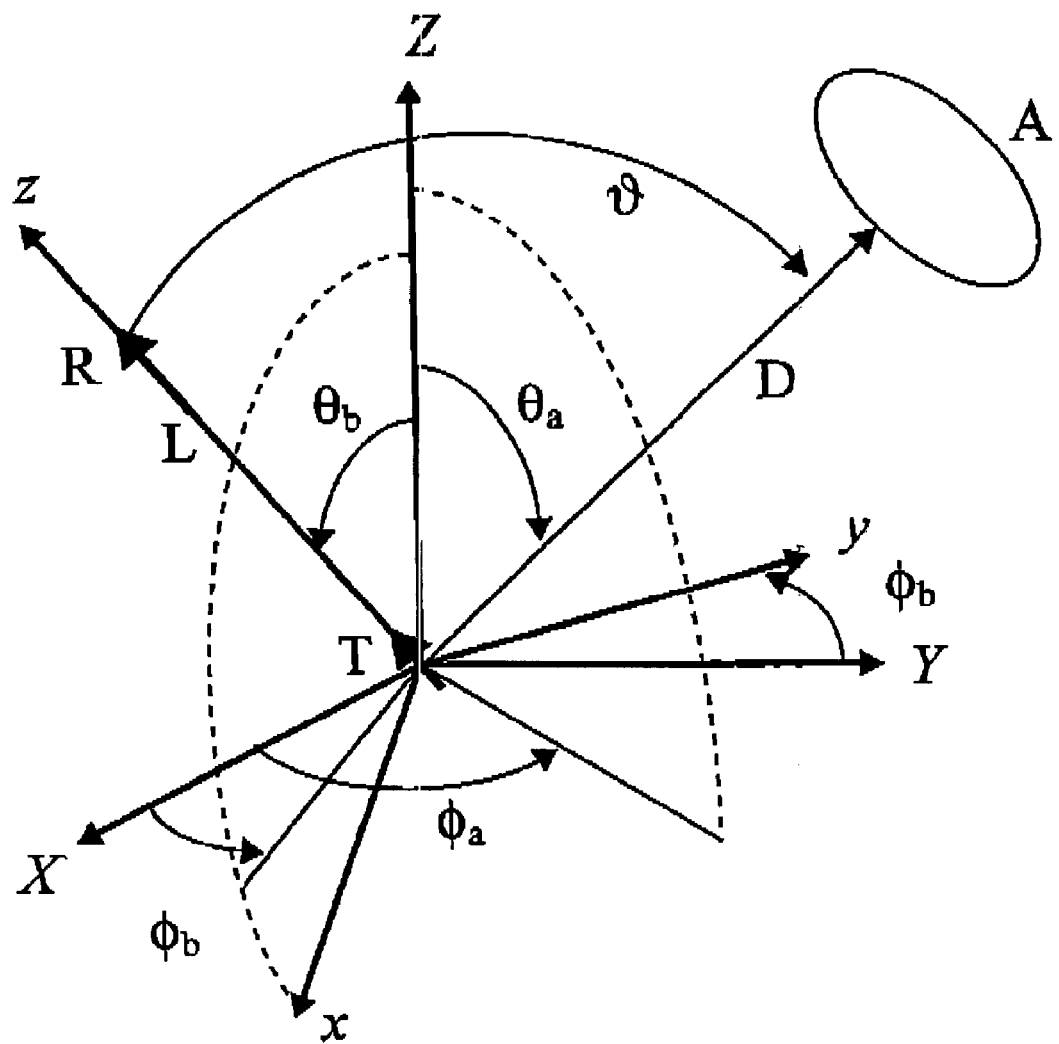
FIG. 3 is a graph illustrating directional angles between tool coordinates and anomaly coordinates.

FIG. 3 illustrates directional angles between tool coordinates and anomaly coordinates. A transmitter coil T is located at an origin that serves as the origin for each coordinate system. A receiver R is placed at a distance L from the transmitter. An earth coordinate system, includes a Z-axis in a vertical direction and an X-axis and a Y-axis in the East and the North directions, respectively. The deviated borehole is specified in the Earth coordinates by a deviation angle θb and its azimuth angle φb. A resistivity anomaly A is located at a distance D from the transmitter in the direction specified by a dip angle θa and its azimuth φa.

Figures 4A, 4B:
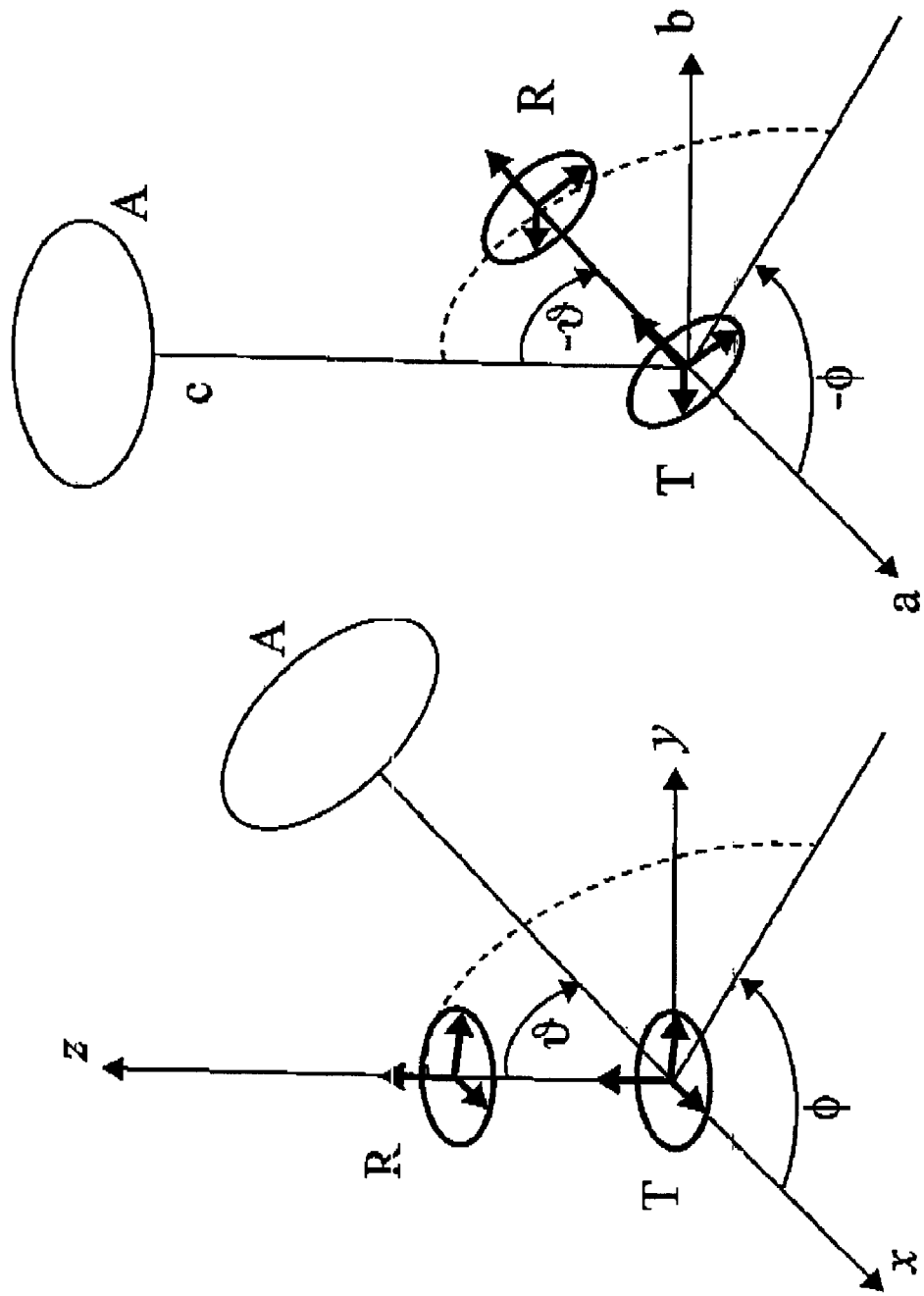
FIG. 4A is a graph showing a resistivity anomaly in a tool coordinate system.
FIG. 4B is a graph showing a resistivity anomaly in an anomaly coordinate system.

In order to practice embodiments of the method, FIG. 4A shows the definition of a tool/borehole coordinate system having x, y, and z axes. The z-axis defines the direction from the transmitter T to the receiver R. The tool coordinates in FIG. 4A are specified by rotating the Earth coordinates (X, Y, Z) by the azimuth angle φb around the Z-axis (x'',y,Z), and then rotating by θb around the y-axis (x,y,z). The direction of the anomaly is specified by the dip angle θ and the azimuth angle φ where:

$$\cos\vartheta = (\hat{b}_z \cdot \hat{a}) = \cos\theta_a \cos\theta_b + \sin\theta_a \sin\theta_b \cos(\varphi_a - \varphi_b) \quad (1)$$

$$\tan\phi = \frac{\sin\theta_b \sin(\phi_a - \phi_b)}{\cos\theta_a \sin\theta_b \cos(\varphi_a - \varphi_b) - \sin\theta_a \cos\theta_b} \quad (2)$$

Similarly, FIG. 4B shows the definition of an anomaly coordinate system having a, b, and c axes. The c-axis defines the direction from the transmitter T to the center of the anomaly A. The anomaly coordinates in FIG. 4B are specified by rotating the Earth coordinates (X, Y, Z) in FIG. 3 by the azimuth angle φa around the Z-axis (a',b,Z), and subsequently rotating by θa around the b-axis (a,b,c). In this coordinate system, the direction of the borehole is specified in a reverse order by the azimuth angle $-\phi$ and the dip angle $-\theta$.

Transient Responses in Two Coordinate Systems

The method is additionally based on the relationship between the transient responses in two coordinate systems. The magnetic field transient responses at the receivers [Rx, Ry, Rz] which are oriented in the [x, y, z] axis direction of the tool coordinates, respectively, are noted as $$\begin{bmatrix} V_{xx} & V_{xy} & V_{xz} \\ V_{yx} & V_{yy} & V_{yz} \\ V_{zx} & V_{zy} & V_{zz} \end{bmatrix} = \begin{bmatrix} R_x \\ R_y \\ R_z \end{bmatrix} [M_x \ M_y \ M_z] \quad (3)$$

from a magnetic dipole source in each axis direction, [$M_x$, $M_y$, $M_z$].

When the resistivity anomaly is distant from the tool, the formation near the tool is seen as a homogeneous formation. For simplicity, the method may assume that the formation is isotropic. Only three non-zero transient responses exist in a homogeneous isotropic formation. These include the coaxial response and two coplanar responses. Coaxial response Vzz(t) is the response when both the transmitter and the receiver are oriented in the common tool axis direction. Coplanar responses, Vxx(t) and Vyy(t), are the responses when both the transmitter T and the receiver R are aligned parallel to each other but their orientation is perpendicular to the tool axis. All of the cross-component responses are identically zero in a homogeneous isotropic formation. Cross-component responses are either from a longitudinally oriented receiver with a transverse transmitter, or vise versa. Another cross-component response is also zero between a mutually orthogonal transverse receiver and transverse transmitter.

The effect of the resistivity anomaly is seen in the transient responses as time increases. In addition to the coaxial and the coplanar responses, the cross-component responses Vij(t) (i≠j; i,j=x,y,z) become non-zero.

The magnetic field transient responses may also be examined in the anomaly coordinate system. The magnetic field transient responses at the receivers [Ra, Rb, Rc] that are oriented in the [a, b, c] axis direction of the anomaly coordinates, respectively, may be noted as $$\begin{bmatrix} V_{aa} & V_{ab} & V_{ac} \\ V_{ba} & V_{bb} & V_{bc} \\ V_{ca} & V_{cb} & V_{cc} \end{bmatrix} = \begin{bmatrix} R_a \\ R_b \\ R_c \end{bmatrix} [M_a \ M_b \ M_c] \quad (4)$$

from a magnetic dipole source in each axis direction, [$M_a$, $M_b$, $M_c$].

When the anomaly is large and distant compared to the transmitter-receiver spacing, the method ignores the effect of spacing can be ignored and the transient responses can be approximated with those of the receivers near the transmitter. Then, the method assumes that axial symmetry exists with respect to the c-axis that is the direction from the transmitter to the center of the anomaly. In such an axially symmetric configuration, the cross-component responses in the anomaly coordinates are identically zero in time-domain measurements.

$$\begin{bmatrix} V_{aa} & V_{ab} & V_{ac} \\ V_{ba} & V_{bb} & V_{bc} \\ V_{ca} & V_{cb} & V_{cc} \end{bmatrix} = \begin{bmatrix} V_{aa} & 0 & 0 \\ 0 & V_{aa} & 0 \\ 0 & 0 & V_{cc} \end{bmatrix} \quad (5)$$

The magnetic field transient responses in the tool coordinates are related to those in the anomaly coordinates by a simple coordinate transformation P(θ,φ) specified by the dip angle θ and azimuth angle φ.

$$\begin{bmatrix} V_{xx} & V_{xy} & V_{xz} \\ V_{yx} & V_{yy} & V_{yz} \\ V_{zx} & V_{zy} & V_{zz} \end{bmatrix} = P(\vartheta, \phi)^{tr} \begin{bmatrix} V_{aa} & V_{ab} & V_{ac} \\ V_{ba} & V_{bb} & V_{bc} \\ V_{ca} & V_{cb} & V_{cc} \end{bmatrix} P(\vartheta, \phi) \quad (6)$$

$$P(\vartheta, \phi) = \begin{bmatrix} \cos\vartheta\cos\phi & \cos\vartheta\sin\phi & -\sin\vartheta \\ -\sin\phi & \cos\phi & 0 \\ \sin\vartheta\cos\phi & \sin\vartheta\sin\phi & \cos\vartheta \end{bmatrix} \quad (7)$$

Determination of Target Direction

The assumptions set forth above contribute to determination of target direction, which is defined as the direction of the anomaly from the origin. When axial symmetry in the anomaly coordinates is assumed, the transient response measurements in the tool coordinates are constrained and the two directional angles may be determined by combinations of tri-axial responses.

$$\begin{bmatrix} V_{xx} & V_{xy} & V_{xz} \\ V_{yx} & V_{yy} & V_{yz} \\ V_{zx} & V_{zy} & V_{zz} \end{bmatrix} = P(\vartheta, \phi)^{tr} \begin{bmatrix} V_{aa} & 0 & 0 \\ 0 & V_{aa} & 0 \\ 0 & 0 & V_{cc} \end{bmatrix} P(\vartheta, \phi) \quad (8)$$

In terms of each tri-axial response $V_{xx} = (V_{aa}\cos^2\theta + V_{cc}\sin^2\theta)\cos^2\phi + V_{aa}\sin^2\phi$ $V_{yy} = (V_{aa}\cos^2\theta + V_{cc}\sin^2\theta)\sin^2\phi + V_{aa}\cos^2\phi$ $V_{zz} = V_{aa}\sin^2\theta + V_{cc}\cos^2\theta \quad (9)$ $V_{xy} = V_{yx} = -(V_{aa} - V_{cc})\sin^2\theta \cos\phi \sin\phi$ $V_{zx} = V_{xz} = -(V_{aa} - V_{cc})\cos\theta \sin\theta \cos\phi$ $V_{yz} = V_{zy} = -(V_{aa} - V_{cc})\cos\theta \sin\theta \sin\phi \quad (10)$ The following relations can be noted:

$V_{xx} + V_{yy} + V_{zz} = 2V_{aa} + V_{cc}$ $V_{xx} - V_{yy} = (V_{cc} - V_{aa})\sin^2\theta(\cos^2\phi - \sin^2\phi)$ $V_{yy} - V_{zz} = -(V_{cc} - V_{aa})(\cos^2\theta - \sin^2\theta \sin^2\phi)$ $V_{zz} - V_{xx} = (V_{cc} - V_{aa})(\cos^2\theta - \sin^2\theta \cos^2\phi) \quad (11)$ Several distinct cases can be noted. In the first of these cases, when none of the cross-components is zero, $V_{XY} \neq 0$ nor $V_{XZ} \neq 0$ nor $V_{ZX} \neq 0$ then the azimuth angle $\phi$ is not zero nor $\pi/2$ (90°), and can be determined by, $$\phi = \frac{1}{2}\tan^{-1}\frac{V_{xy} + V_{yx}}{V_{xx} - V_{yy}} \quad (12)$$

$$\phi = \tan^{-1}\frac{V_{yz}}{V_{xz}} = \tan^{-1}\frac{V_{zy}}{V_{zx}}$$

By noting the relation, $$\frac{V_{xy}}{V_{xz}} = \tan\vartheta\sin\phi \text{ and } \frac{V_{xy}}{V_{yz}} = \tan\vartheta\cos\phi \quad (13)$$

the dip (deviation) angle $\theta$ is determined by, $$\tan\vartheta = \sqrt{\left(\frac{V_{xy}}{V_{xz}}\right)^2 + \left(\frac{V_{xy}}{V_{yz}}\right)^2} \quad (14)$$

In the second case, when $V_{XY}=0$ and $V_{YZ}=0$ then $\theta=0$ or $\phi=0$ or $\pi$ (180°) or $\phi=\pm\pi/2$ (90°) and $\theta=\pm\pi/2$ (90°), as the coaxial and the coplanar responses should differ from each other ($V_{aa} \neq V_{cc}$).

If $\phi=0$, then the dip angle $\theta$ is determined by, $$\vartheta = -\frac{1}{2}\tan^{-1}\frac{V_{xz} + V_{zx}}{V_{xx} - V_{zz}} \quad (15)$$

If $\phi=\pi$ (180°), then the dip angle $\theta$ is determined by, $$\vartheta = +\frac{1}{2}\tan^{-1}\frac{V_{xz} + V_{zx}}{V_{xx} - V_{zz}} \quad (16)$$

Also, with regard to the second case, If $\theta=0$, then $V_{xx}=V_{yy}$ and $V_{zx}=0$. If $\phi=\pm\pi/2$ (90°) and $\theta=\pm\pi/2$ (90°), then $V_{zz}=V_{xx}$ and $V_{zx}=0$. These instances are further discussed below with relation to the fifth case.

In the third case, when $V_{XY}=0$ and $V_{XZ}=0$, then $\phi=\pm\pi/2$ (90°) or $\theta=0$ or $\phi=0$ and $\theta=\pm\pi/2$ (90°). If $\phi=\pi/2$, then the dip angle $\theta$ is determined by, $$\vartheta = -\frac{1}{2}\tan^{-1}\frac{V_{yz} + V_{zy}}{V_{yy} - V_{zz}} \quad (17)$$

If $\phi=-\pi/2$, then the dip angle $\theta$ is determined by, $$\vartheta = +\frac{1}{2}\tan^{-1}\frac{V_{yz} + V_{zy}}{V_{yy} - V_{zz}} \quad (18)$$

Also with regard to the third case, If $\theta=0$, then $V_{xx}=V_{yy}$ and $V_{yz}=0$. If $\phi=0$ and $\theta=\pm\pi/2$ (90°), $V_{yy}=V_{zz}$ and $V_{yz}=0$. These situations are further discussed below with relation to the fifth case.

In the fourth case, $V_{XZ}=0$ and $V_{YZ}=0$, then $\theta=0$ or $\pi(180°)$ or $\pm\pi/2$ (90°). If $\theta=\pm\pi/2$, then the azimuth angle $\phi$ is determined by, $$\phi = -\frac{1}{2}\tan^{-1}\frac{V_{xy} + V_{yx}}{V_{xx} - V_{yy}} \quad (19)$$

Also with regard to the fourth case, if $\theta=0$ or $\pi(180°)$, then $V_{xx}=V_{yy}$ and $V_{yz}=0$. This situation is also shown below with relation to the fifth case.

In the fifth case, all cross components vanish, $V_{XZ}=V_{YZ}=V_{XY}=0$, then $\theta=0$, or $\theta=\pm\pi/2$ (90°) and $\phi=0$ or $\pm\pi/2$ (90°).

If $V_{xx}=V_{yy}$ then $\theta=0$ or $\pi(180°)$.

If $V_{yy}=V_{zz}$ then $\theta=\pm\pi/2$ (90°) and $\phi=0$.

If $V_{zz}=V_{xx}$ then $\theta=\pm\pi/2$ (90°) and $\phi=\pm\pi/2$ (90°).

Tool Rotation Around The Tool/borehole Axis

Figure 5:
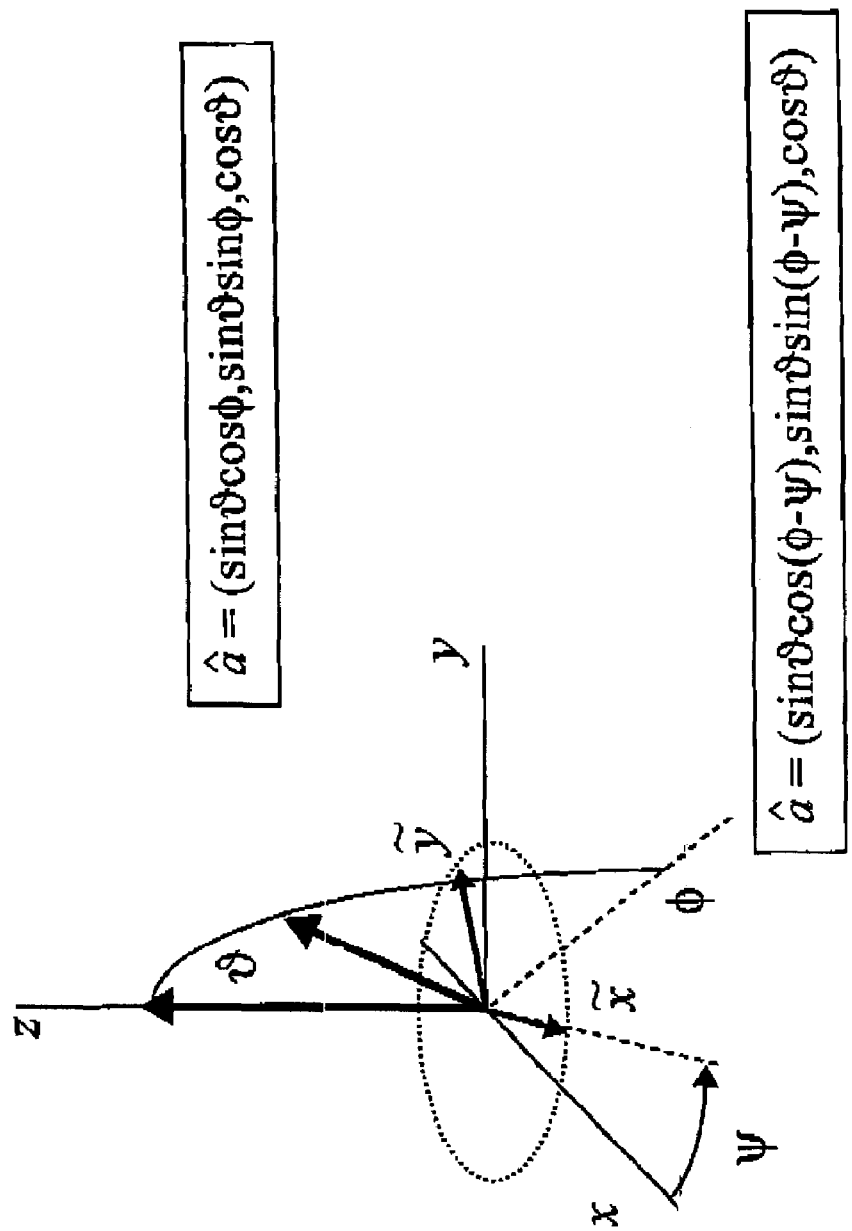
FIG. 5 is a graph illustrating tool rotation within a borehole.

In the above analysis, all the transient responses $V_{ij}(t)$ (i,j=x,y,z) are specified by the x-, y-, and z-axis directions of the tool coordinates. However, the tool rotates inside the borehole and the azimuth orientation of the transmitter and the receiver no longer coincides with the x- or y-axis direction as shown in FIG. 5. If the measured responses are $V_{\tilde{i},\tilde{j}}(\tilde{i},\tilde{j}=\tilde{x},\tilde{y},z)$ where $\tilde{x}$ and $\tilde{y}$ axis are the direction of antennas fixed to the rotating tool, and $\psi$ is the tool's rotation angle, then $$\begin{bmatrix} V_{\tilde{x}\tilde{x}} & V_{\tilde{x}\tilde{y}} & V_{\tilde{x}z} \\ V_{\tilde{y}\tilde{x}} & V_{\tilde{y}\tilde{y}} & V_{\tilde{y}z} \\ V_{z\tilde{x}} & V_{z\tilde{y}} & V_{zz} \end{bmatrix} = R(\psi)^{tr} \begin{bmatrix} V_{xx} & V_{xy} & V_{xz} \\ V_{yx} & V_{yy} & V_{yz} \\ V_{zx} & V_{zy} & V_{zz} \end{bmatrix} R(\psi) \quad (20)$$

$$R(\psi) = \begin{bmatrix} \cos(\psi) & -\sin\psi & 0 \\ \sin\psi & \cos\psi & 0 \\ 0 & 0 & 1 \end{bmatrix} \quad (21)$$

Then, $V_{\tilde{x}\tilde{x}} = (V_{aa}\cos^2\theta + V_{cc}\sin^2\theta)\cos^2(\phi-\psi) + V_{aa}\sin^2(\phi-\psi)$ $V_{\tilde{y}\tilde{y}} = (V_{aa}\cos^2\theta + V_{cc}\sin^2\theta)\sin^2(\phi-\psi) + V_{aa}\cos^2(\phi-\psi)$ $V_{zz} = V_{aa}\sin^2\theta + V_{cc}\cos^2\theta \quad (22)$ $V_{\tilde{x}\tilde{y}} = V_{\tilde{y}\tilde{x}} = -(V_{aa} - V_{cc})\sin^2\theta \cos(\phi-\psi)\sin(\phi-\psi)$ $V_{z\tilde{x}} = V_{\tilde{x}z} = -(V_{aa} - V_{cc})\cos\theta \sin\theta \cos(\phi-\psi)$ $V_{\tilde{y}z} = V_{z\tilde{y}} = -(V_{aa} - V_{cc})\cos\theta \sin\theta \sin(\phi-\psi) \quad (23)$ The following relations apply:

$V_{\tilde{x}\tilde{x}} + V_{\tilde{y}\tilde{y}} + V_{zz} = 2V_{aa} + V_{cc}$ $V_{\tilde{x}\tilde{x}} - V_{\tilde{y}\tilde{y}} = (V_{cc} - V_{aa})\sin^2\theta\{\cos^2(\phi-\psi) - \sin^2(\phi-\psi)\}$ $V_{\tilde{y}\tilde{y}} V_{zz} = -(V_{cc} - V_{aa})\{\cos^2\theta - \sin^2\theta \sin^2(\phi-\psi)\}$ $V_{zz} - V_{\tilde{x}\tilde{x}} = (V_{cc} - V_{aa})\{\cos^2\theta - \sin^2\theta \cos^2(\phi-\psi)\} \quad (24)$ Consequently, $$\phi - \psi = \frac{1}{2}\tan^{-1}\frac{V_{\tilde{x}\tilde{y}} + V_{\tilde{y}\tilde{x}}}{V_{\tilde{x}\tilde{x}} - V_{\tilde{y}\tilde{y}}} \quad (25)$$

$$\phi - \psi = \tan^{-1}\frac{V_{\tilde{y}z}}{V_{\tilde{x}z}} = \tan^{-1}\frac{V_{z\tilde{y}}}{V_{z\tilde{x}}}$$

The azimuth angle $\phi$ is measured from the tri-axial responses if the tool rotation angle $\psi$ is known. To the contrary, the dip (deviation) angle $\theta$ is determined by $$\tan\vartheta = \sqrt{\left(\frac{V_{\tilde{x}\tilde{y}}}{V_{\tilde{x}z}}\right)^2 + \left(\frac{V_{\tilde{x}\tilde{y}}}{V_{\tilde{y}z}}\right)^2} \quad (26)$$

without knowing the tool orientation $\psi$.

Apparent Dip Angle and Azimuth Angle and the Distance to the Anomaly

The dip and the azimuth angle described above indicate the direction of a resistive anomaly determined by a combination of tri-axial transient responses at a time t when the angles have deviated from a zero value. When t is small or close to zero, the effect of such anomaly is not apparent in the transient responses as all the cross-component responses are vanishing. To identify the anomaly and estimate not only its direction but also the distance, it is useful to define the apparent azimuth angle $\phi_{app}(t)$ by, $$\phi_{app}(t) = \frac{1}{2}\tan^{-1}\frac{V_{xy}(t) + V_{yx}(t)}{V_{xx}(t) - V_{yy}(t)} \quad (27)$$

$$\phi_{app}(t) = \tan^{-1}\frac{V_{yz}(t)}{V_{xz}(t)} = \tan^{-1}\frac{V_{zy}(t)}{V_{zx}(t)}$$

and the effective dip angle $\theta_{app}(t)$ by $$\tan\vartheta_{app}(t) = \sqrt{\left(\frac{V_{xy}(t)}{V_{xz}(t)}\right)^2 + \left(\frac{V_{xy}(t)}{V_{yz}(t)}\right)^2} \quad (28)$$

for or the time interval when $\phi_{app}(t) \neq 0$ nor $\pi/2$ (90°). For simplicity, the case examined below is one in which none of the cross-component measurements is identically zero: $V_{xy}(t) \neq 0$, $V_{yz}(t) \neq 0$, and $V_{zx}(t) \neq 0$.

For the time interval when $\phi_{app}(t)=0$, $\theta_{app}(t)$ is defined by, $$\vartheta_{app}(t) = -\frac{1}{2}\tan^{-1}\frac{V_{xz}(t) + V_{zx}(t)}{V_{xx}(t) - V_{zz}(t)} \quad (29)$$

For the time interval when $\phi_{app}(t)=\pi/2$ (90°), $\theta_{app}(t)$ is defined by, $$\vartheta_{app}(t) = -\frac{1}{2}\tan^{-1}\frac{V_{yz}(t) + V_{zy}(t)}{V_{yy}(t) - V_{zz}(t)} \quad (30)$$

When t is small and the transient responses do not see the effect of a resistive anomaly at distance, the effective angles are identically zero, $\phi_{app}(t)=\theta_{app}(t)=0$. As t increases, when the transient responses see the effect of the anomaly, $\phi_{app}(t)$ and $\theta_{app}(t)$ begin to show the true azimuth and the true dip angles. The distance to the anomaly may be indicated at the time when $\phi_{app}(t)$ and $\theta_{app}(t)$ start deviating from the initial zero values. As shown below in a modeling example, the presence of an anomaly is detected much earlier in time in the effective angles than in the apparent conductivity $\sigma_{app}(t)$. Even if the resistivity of the anomaly may not be known until $\sigma_{app}(t)$ is affected by the anomaly, its presence and the direction can be measured by the apparent angles. With limitation in time measurement, the distant anomaly may not be seen in the change of $\sigma_{app}(t)$ but is visible in $\phi_{app}(t)$ and $\theta_{app}(t)$.

MODELING EXAMPLE

Figure 6:
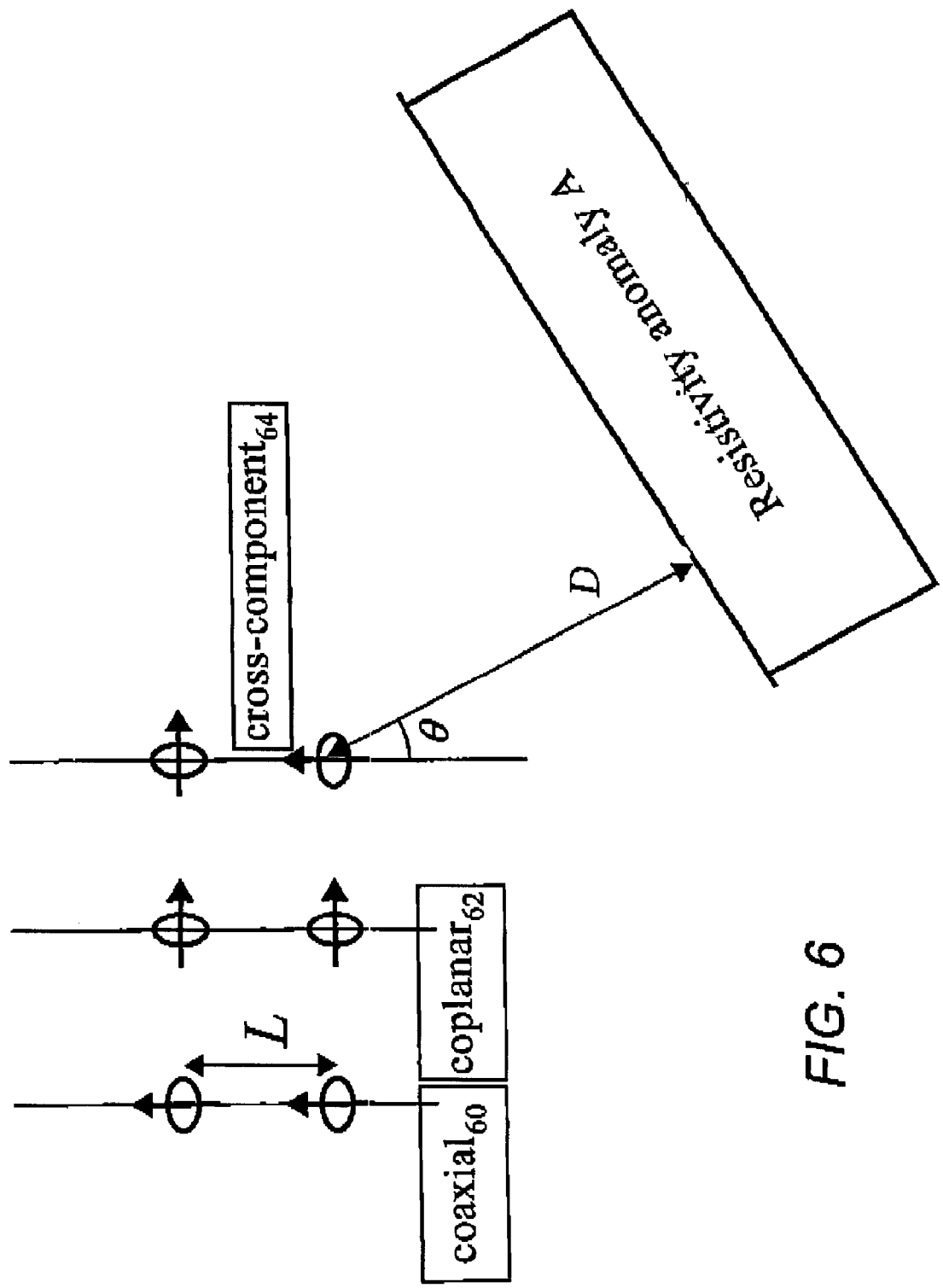
FIG. 6 is a graph showing directional components.

A simplified modeling example exists when a resistivity anomaly is a massive salt dome, and the salt interface may be regarded as a plane interface. For further simplification, it can be assumed that the azimuth of the salt face is known. Accordingly, the remaining unknowns are the distance D to the salt face from the tool, the isotropic or anisotropic formation resistivity, and the approach angle (or dip angle) $\theta$ as shown in FIG. 6.

Figure 9:
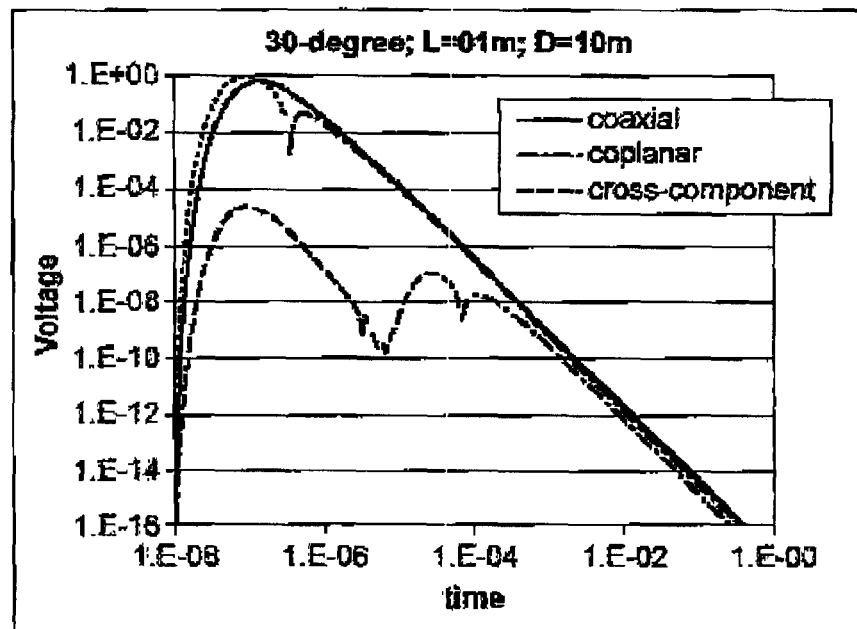
FIGS. 9 and 10 are plots showing the voltage from the coaxial $V_{zz}(t)$, coplanar $V_{xx}(t)$, and cross-component $V_{zx}(t)$ measurements for L=1m, for $\theta=30°$, and at salt distance D=1 m and D=10 m respectively.
Figure 10:
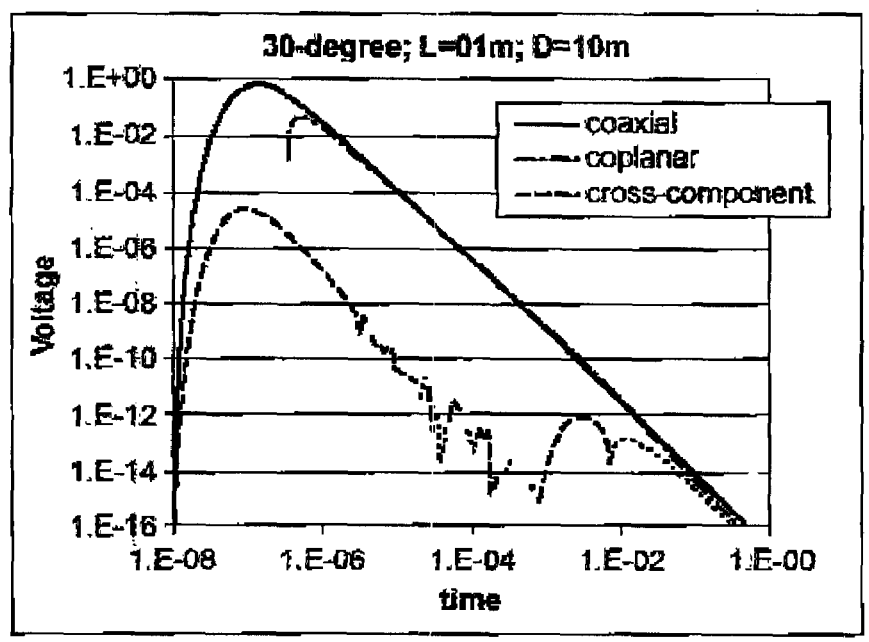

FIG. 9 and FIG. 10 show the voltage from the coaxial $V_{zz}(t)$, coplanar $V_{xx}(t)$, and the cross-component $V_{zx}(t)$ measurements for L=1 m, for θ=30°, and at salt distance D=1 m and D=10 m respectively. The apparent dip $\theta_{app}(t)$ is defined by, $$\theta_{app}(t) = -\frac{1}{2}\tan^{-1}\frac{V_{zx}(t) + V_{xz}(t)}{V_{zz}(t) - V_{xx}(t)}. \quad (31)$$

Figure 11:
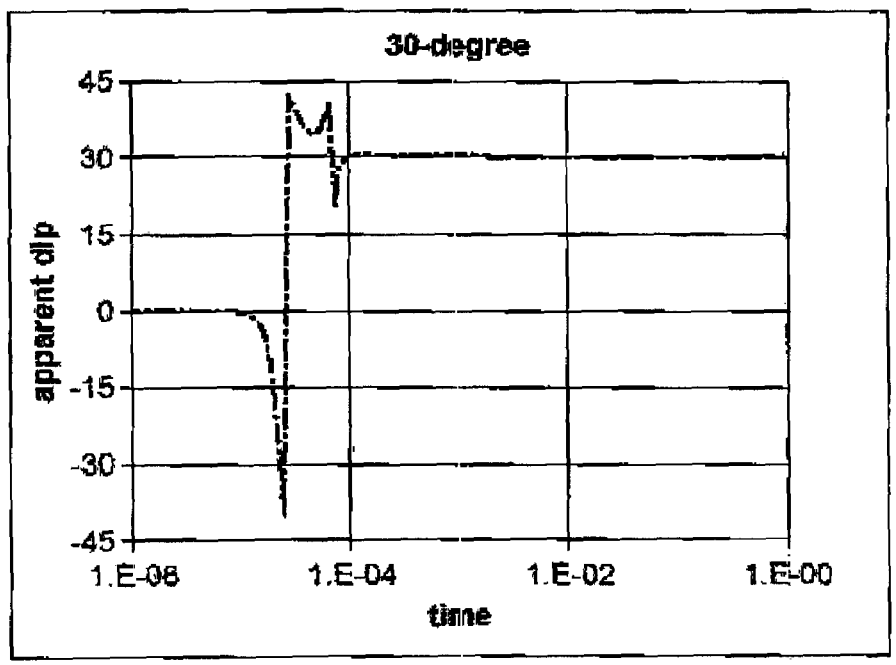
FIG. 11 is a plot showing the apparent dip $\theta_{app}(t)$ for the L=1 m tool assembly when the salt face is D=1 m away and at the approach angle of $\theta=30°$.

FIG. 11 shows the apparent dip $\theta_{app}(t)$ for the L=1 m tool assembly when the salt face is D=1 m away and at the approach angle of θ=30°.

Figure 13:
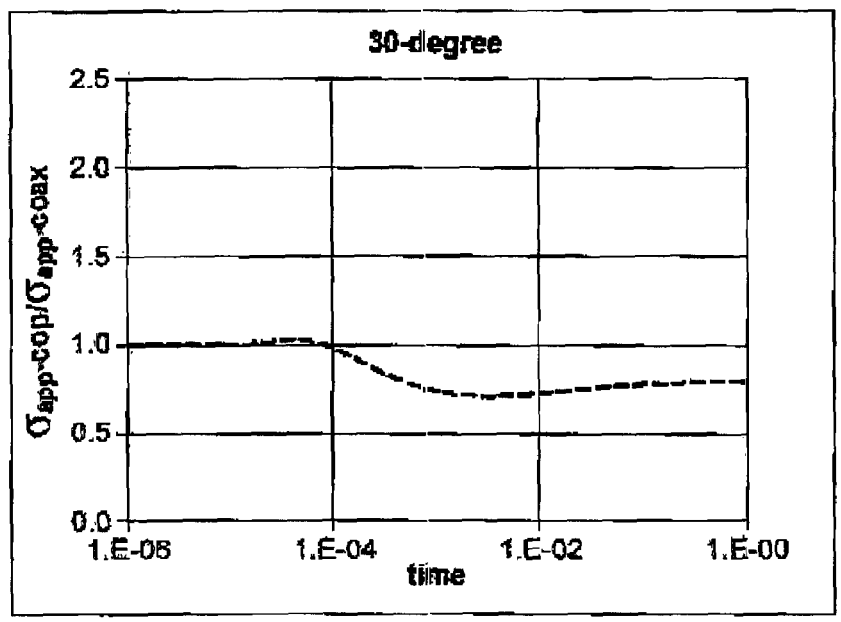
FIG. 13 is a plot showing the ratio, $\sigma_{app\text{-}coplanar}(t)/\sigma_{app\text{-}coaxial}(t)$, that is available without cross-component $V_{zx}(t)$ measurements.

In addition, the apparent conductivity $\sigma_{app}(t)$ from both the coaxial $V_{zz}(t)$ and the coplanar $V_{xx}(t)$ responses is shown in FIG. 13.

Also plotted is the ratio, $\sigma_{app\text{-}coplanar}(t)/\sigma_{app\text{-}coaxial}(t)$, that is available without cross-component $V_z(t)$ measurements as shown in FIG. 13.

Figure 12:
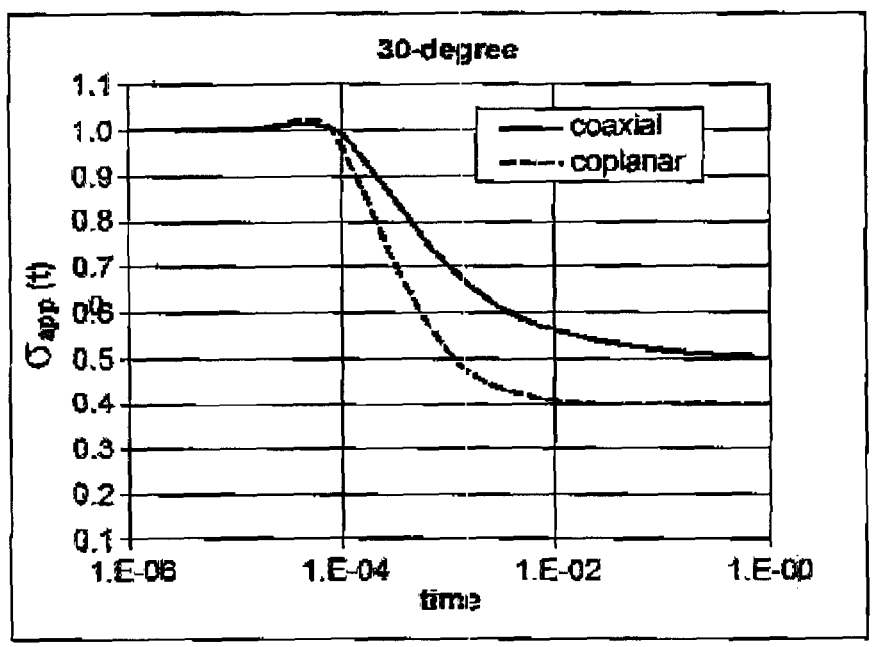
FIG. 12 is a plot showing the apparent conductivity $\sigma_{app}(t)$ from both coaxial $V_{zz}(t)$ and the coplanar $V_{xx}(t)$ responses.

Note that the direction to the salt face is immediately identified in the $\theta_{app}(t)$ plot of FIG. 11 as early as $10^{-4}$ s when the presence of the resistive anomaly is bared detected in the $\sigma_{app}(t)$ plot of FIG. 12. It takes almost $10^{-3}$ s for the apparent conductivity to approach an asymptotic $\sigma_{app}$(later t) and for the apparent conductivity ratio to read θ=30 °.

Figure 14:
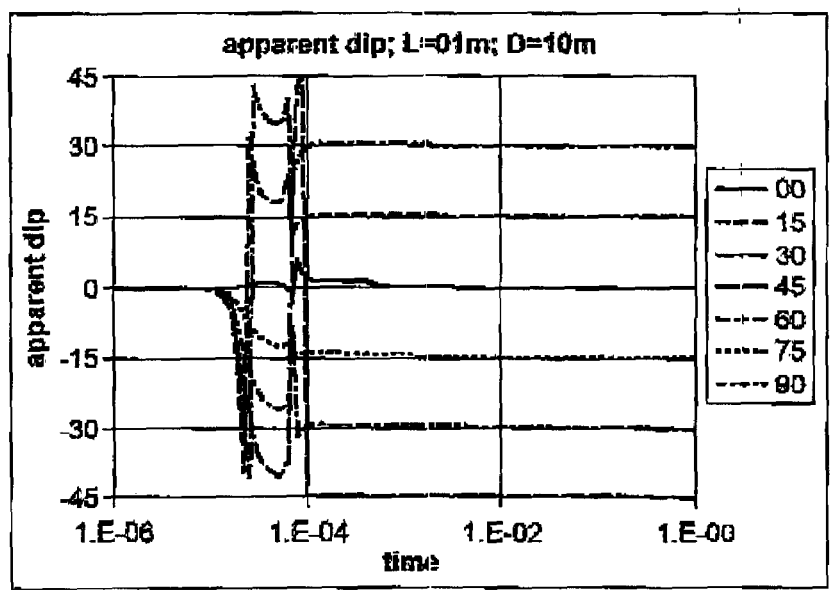
FIG. 14 is a plot showing the apparent dip $\theta_{app}(t)$ for the L=1 m tool assembly when the salt is D=1 m away but at different angles between the tool axis and the target.

FIG. 14 shows the apparent dip $\theta_{app}(t)$ for the L=1 m tool assembly when the salt is D=1 m away, but at different angles between the tool axis and the target. The approach angle (θ) may be identified at any angle.

Figure 15:
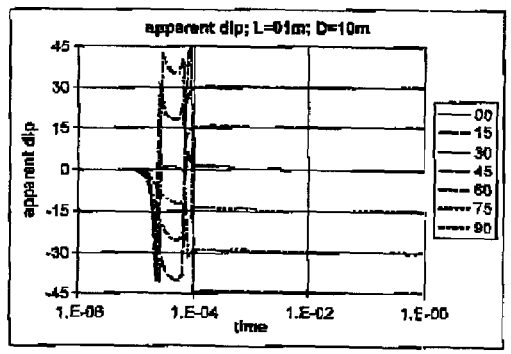
FIGS. 15, 16, and 17 compare the $\theta_{app}(t)$ for different salt face distances including D=1 m, 5 m, and 10 m.
Figure 16:
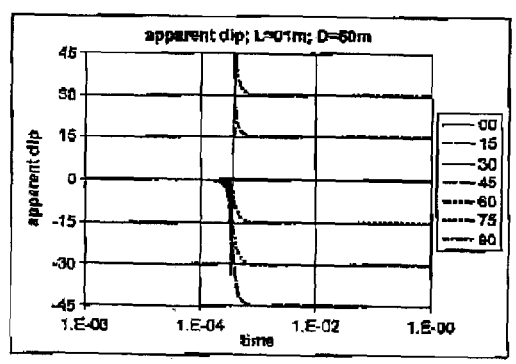
Figure 17:
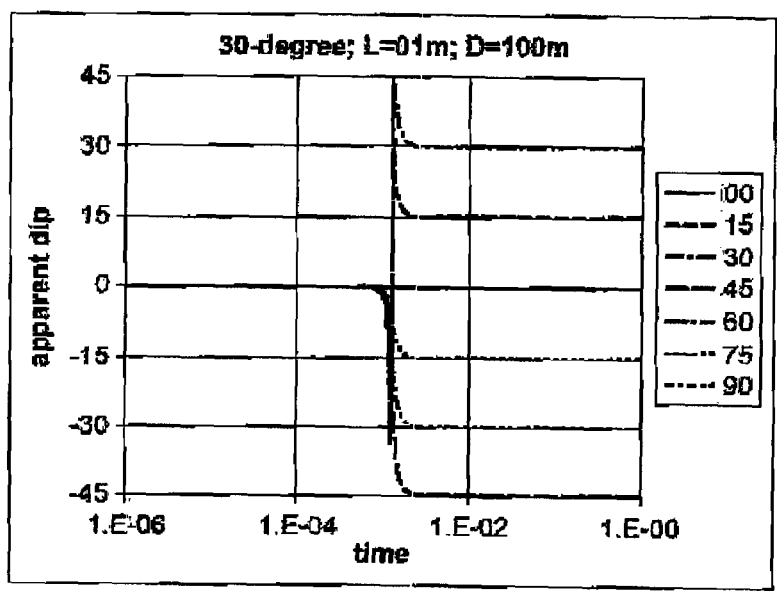

FIGS. 15, 16, and 17 below compare the apparent dip $\theta_{app}(t)$ for different salt face distances including D=1 m, 5 m, and 10 m.

The distance to the salt face can be also determined by the transition time at which $\theta_{app}(t)$ takes an asymptotic value. Even the salt at 10 m away can be identified and its direction can be measured by the $\theta_{app}(t)$.

In summary, the method considers the coordinate transformation of transient EM responses tool-fixed coordinates and anomaly-fixed coordinates. When the anomaly is large and far away compared to the transmitter-receiver spacing, one may ignore the effect of spacing and approximate the transient EM responses with those of the receivers near the transmitter. Then, one may assume axial symmetry exists with respect to the c-axis that defines the direction from the transmitter to the anomaly. In such an axially symmetric configuration, the cross-component responses in the anomaly-fixed coordinates are identically zero. With this assumption, a general method is provided for determining the direction to the resistivity anomaly using tri-axial transient EM responses.

The method defines the apparent dip $\theta_{app}(t)$ and the apparent azimuth $\phi_{app}(t)$ by combinations of tri-axial transient measurements. The apparent direction $\{\theta_{app}(t), \phi_{app}(t)\}$ reads the true direction $\{\theta, \phi\}$ at later time. The $\theta_{app}(t)$ and $\phi_{app}(t)$ both read zero when t is small and the effect of the anomaly is not sensed in the transient responses or the apparent conductivity. The conductivities $\sigma_{coaxial}(t)$ and $\sigma_{coplanar}(t)$ from the coaxial and coplanar measurements both indicate the conductivity of the near formation around the tool.

Deviation of the apparent direction $\{\theta_{app}(t), \phi_{app}(t)\}$ from zero identifies the anomaly. The distance to the anomaly is measured by the time when the apparent direction. $\{\theta_{app}(t), \phi_{app}(t)\}$ approaches the true direction $\{\theta,\phi\}$. The distance can be also measured from the change in the apparent conductivity. However, the anomaly is identified and measured much earlier in time in the apparent direction than in the apparent conductivity.

Apparent Conductivity

As set forth above, apparent conductivity can be used as an alternative technique to apparent angles in order to determine the location of an anomaly in a wellbore. The time-dependent apparent conductivity can be defined at each point of a time series at each logging depth. The apparent conductivity at a logging depth z is defined as the conductivity of a homogeneous formation that would generate the same tool response measured at the selected position.

In transient EM logging, transient data are collected at a logging depth or tool location z as a time series of induced voltages in a receiver loop. Accordingly, time dependent apparent conductivity ($\sigma(z;t)$) may be defined at each point of the time series at each logging depth, for a proper range of time intervals depending on the formation conductivity and the tool specifications.

Apparent Conductivity for Coaxial Tool

The induced voltage of a coaxial tool with transmitter-receiver spacing L in the homogeneous formation of conductivity σ is given by, $$V_{zZ}(t) = C\frac{(\mu_0\sigma)^{3/2}}{8t^{5/2}}e^{-u^2} \quad (32)$$

where $u^2 = \frac{\mu_0\sigma}{4}\frac{L^2}{t}$ and C is a constant.

Figure 7:
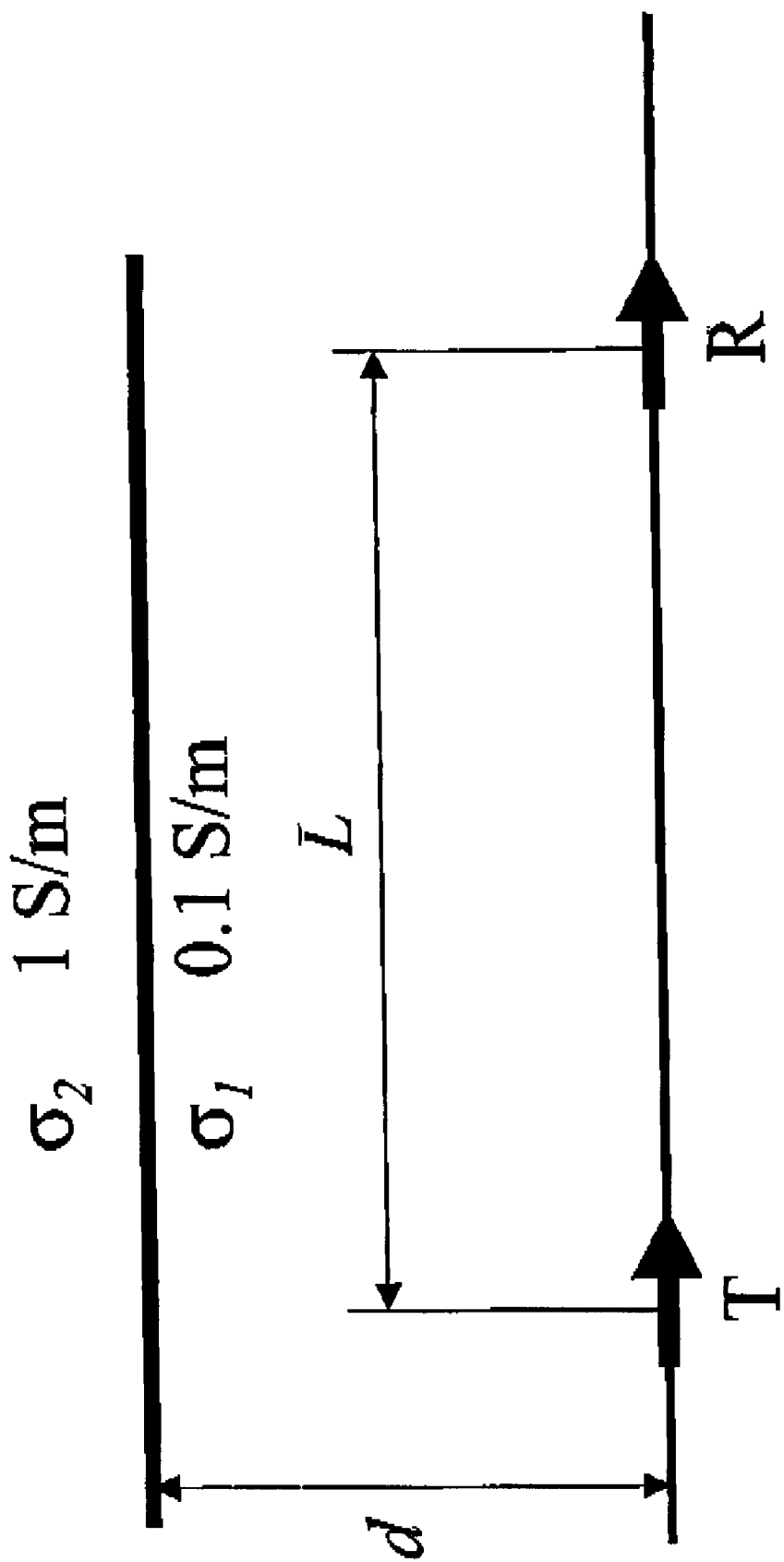
FIG. 7 is a schematic showing apparent conductivity with a coaxial tool.

FIG. 7 shows the voltage response for different values of d, t, and L in a coaxial tool in which both a transmitter coil and receiver coil are wound around the common tool axis. The symbols $\sigma_1$ and $\sigma_2$ may represent the conductivities of two formation layers.

Figure 18:
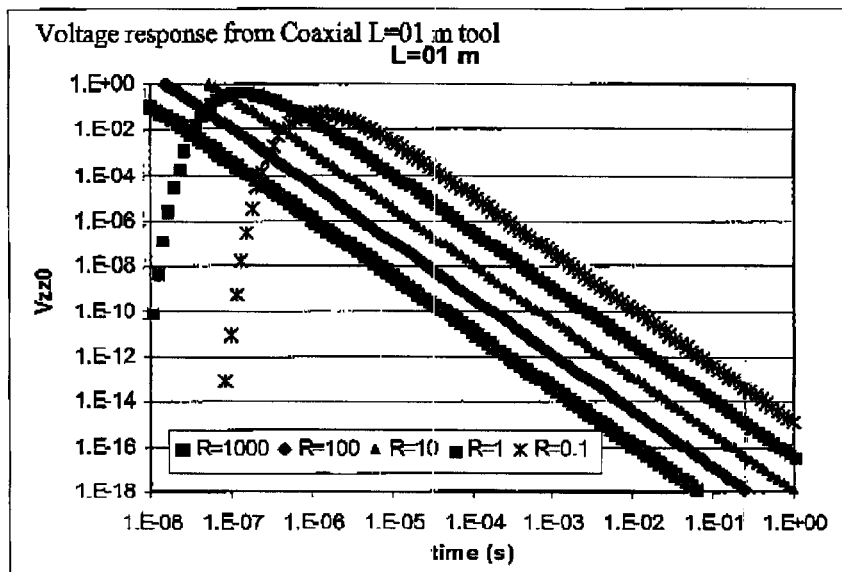
FIG. 18 is a plot showing the voltage response of the tool with L=0 m in the homogeneous formation for the formation resistivity form 1000 ohm-m to 0.1 ohm-m.

FIG. 18 shows the voltage response of the tool with L=0 m in the homogeneous formation for various formation resistivity from 1000 ohm-m to 0.1 ohm-m. The voltage is positive at all times t for t>0. The slope of the voltage is nearly constant, $$\frac{\partial \ln V_{zZ}(t)}{\partial \ln t} \approx -\frac{5}{2}$$

in the time interval between $10^{-8}$ s and 1 s (and later) for the formation resistivity larger than 10 ohm-m. The slope changes sign at an earlier time around $10^{-6}$ s when the resistivity is low as 0.1 ohm-m.

Figure 19:
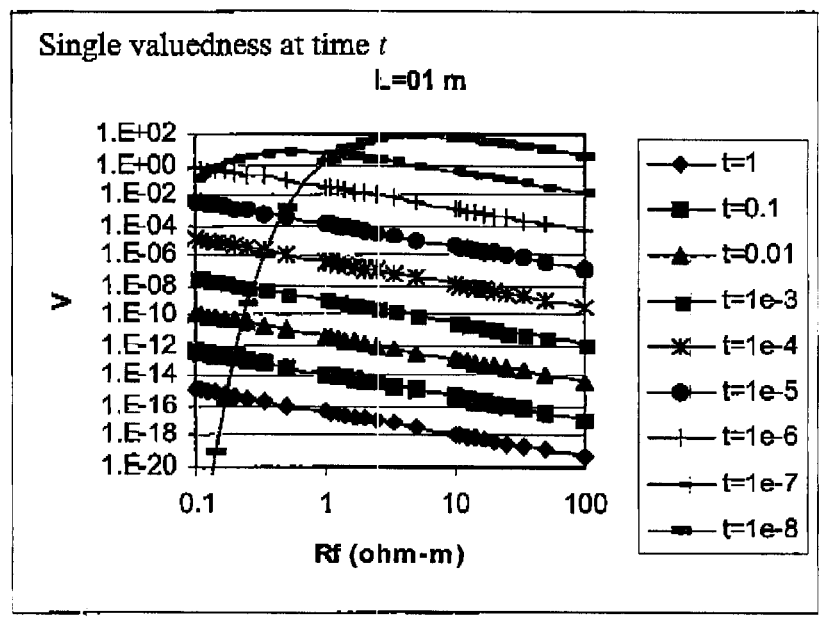
FIG. 19 is a plot showing the voltage response as a function of formation resistivity (or conductivity) at greater times t.

FIG. 19 shows the voltage response as a function of formation resistivity (or conductivity) at greater times t. For the resistivity range from 0.1-ohm-m to 100-ohm-m, the voltage response is single valued as a function of formation resistivity for the measurement time later than $10^{-6}$ s. At a smaller t, for instance at $10^{-7}$ s, the voltage is no longer single valued. The same voltage response is realized at two different formation resistivity values.

Figure 20:
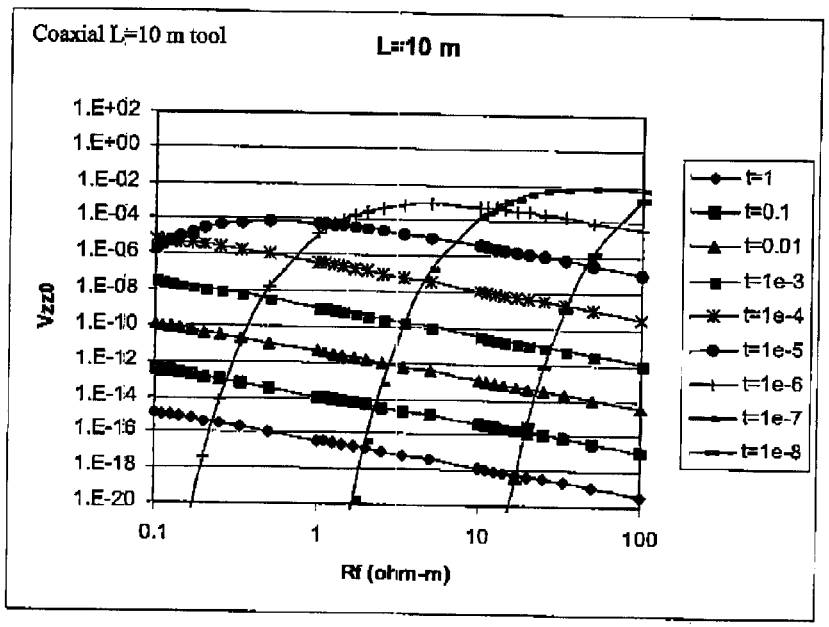
FIG. 20 is a plot showing the voltage response as a function of formation resistivity (or conductivity) for a larger transmitter-receiver spacing of L=1 m.

FIG. 20 shows the voltage response as a function of formation resistivity (or conductivity) for a larger transmitter-receiver spacing of L=1 m. The time interval when the voltage response is single valued is shifted toward larger times t. The voltage response is single valued for resistivity from 0.1-ohm-m to 100-ohm-m, for the measurement time later than $10^{-4}$ s. At smaller values of t, for instance at t=$10^{-5}$ s, the voltage is no longer single valued. The apparent conductivity from a single measurement (coaxial, single spacing) alone is not well defined.

For relatively compact transmitter-receiver spacing (L=1 m to 1 m), and for the time measurement interval where t is greater than $10^{-6}$ s, the transient EM voltage response is mostly single valued as a function of formation resistivity between 0.1-ohm-m and 100-ohm-m (and higher). This enables definition of the time-changing apparent conductivity (or resistivity) from the voltage response $V_{zZ}(t)$ at each time of measurement as:

$$C\frac{(\mu_0\sigma_{app}(t))^{3/2}}{8t^{5/2}}e^{-u_{app}(t)^2} = V_{zZ}(t) \quad (33)$$

$$\text{where } u_{app}(t)^2 = \frac{\mu_0\sigma_{app}(t)}{4}\frac{L^2}{t}$$

and $V_{zZ}(t)$ on the right hand side is the measured voltage response of the coaxial tool. The greater the spacing L, the larger the measurement time t should be to apply the apparent conductivity concept from the concept from a single type of measurement (coaxial, single spacing). The $\sigma_{app}(t)$ should be constant and equal to the formation conductivity in a homogeneous formation: $\sigma_{app}(t)=\sigma$. The deviation from a constant $\sigma$ at time t suggests a conductivity anomaly in the region specified by time t.

Apparent Conductivity for a Coplanar Tool

The induced voltage of the coplanar tool with transmitter-receiver spacing L in the homogeneous formation of conductivity $\sigma$ is given by, $$V_{xX}(t) = C\frac{(\mu_0\sigma)^{3/2}}{8t^{5/2}}(1-u^2)e^{-u^2} \quad (34)$$

$$\text{where } u^2 = \frac{\mu_0\sigma}{4}\frac{L^2}{t}$$

and C is a constant. At small values of t, the coplanar voltage changes polarity depending on the spacing L and the formation conductivity.

Figure 8:
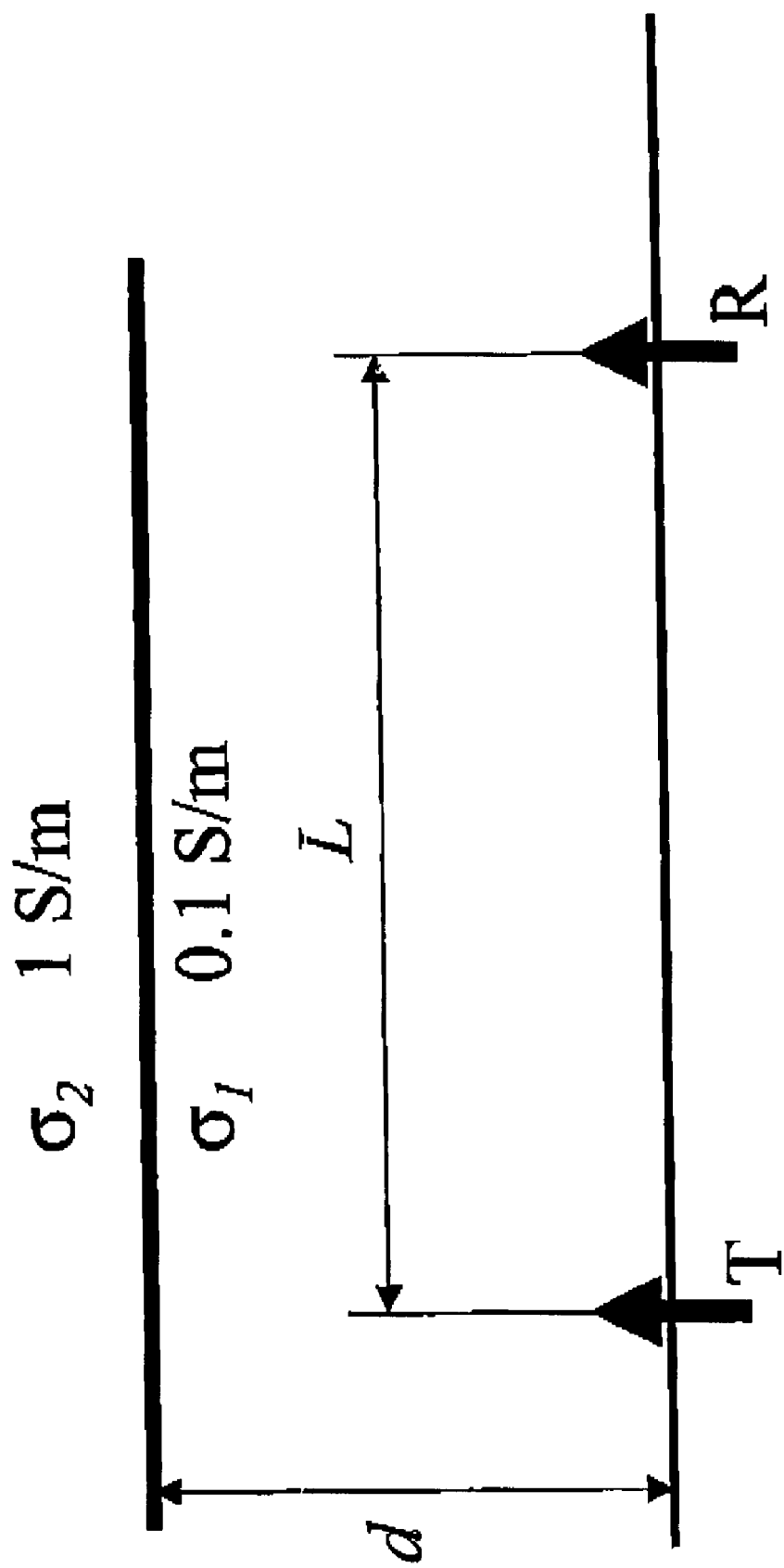
FIG. 8 is a schematic showing apparent conductivity with a coplanar tool.

In a coplanar tool in which the transmitter and the receiver are parallel to each other and oriented perpendicularly to the tool axis, FIG. 8 shows the apparent conductivities for different values d, t, and L.

Figure 21:
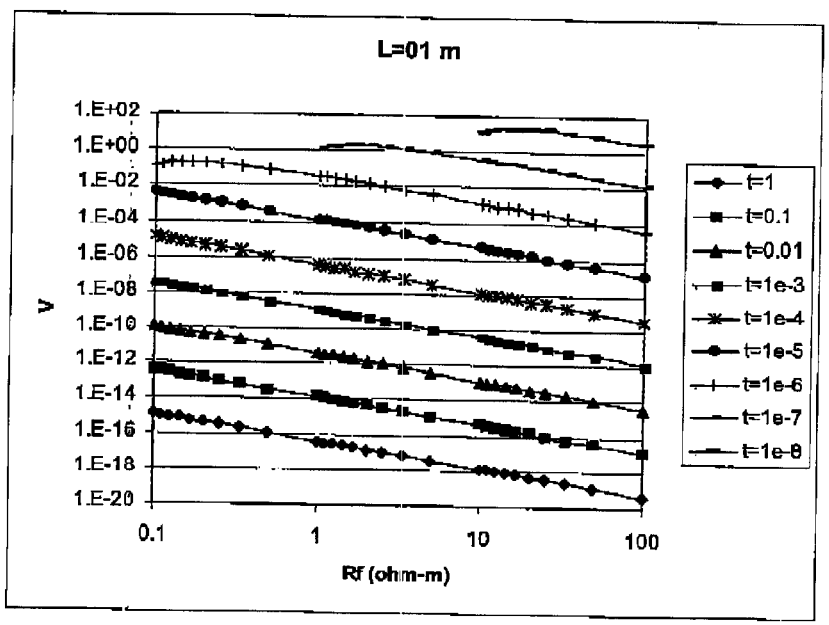
FIG. 21 is a plot showing the coplanar voltage response of the L=0 m tool as a function of formation resistivity (or conductivity) at different times of t.

FIG. 21 shows the coplanar voltage response of the L= m tool as function of formation resistivity (or conductivity) at different times of t. For the resistivity range from 0.1 ohm-m to 100 ohm-m, the voltage response is single valued as a function of formation resistivity for values of t larger than $10^{-6}$ s. At smaller values of t, for instance at $t=10^{-7}$ s, the voltage changes polarity and is no longer single valued.

Figure 22:
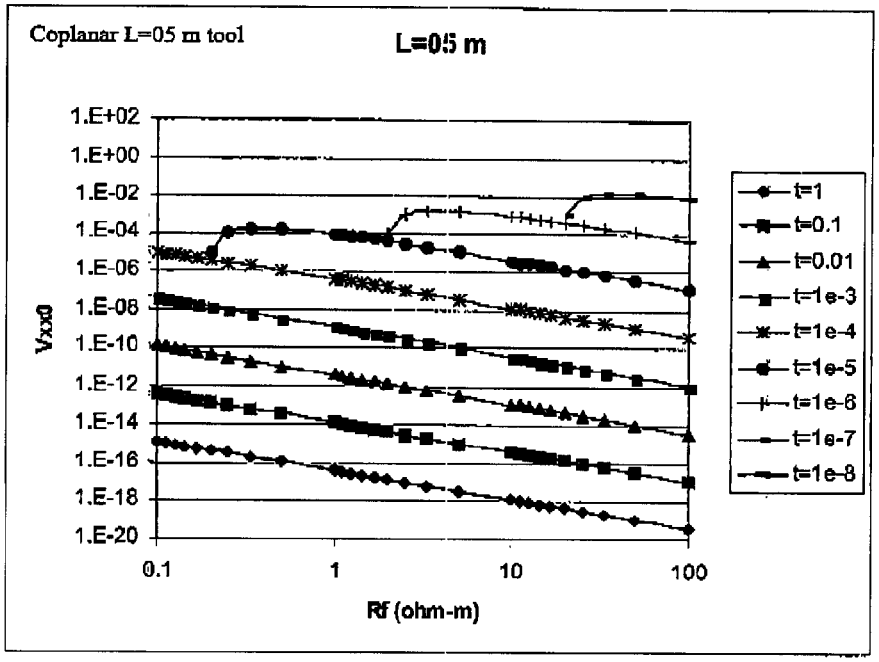
FIG. 22 is a plot showing the coplanar response of longer tool of L=05ml

FIG. 22 shows the coplanar voltage response of a longer tool of L=05m. The time interval when the voltage response is single valued is shifted towards larger values of t.

Similarly to the coaxial tool response, the time-changing apparent conductivity (or resistivity) is defined from the coplanar tool response $V_{xX}(t)$ at each time of measurement as, $$C\frac{(\mu_0\sigma_{app}(t))^{3/2}}{8t^{5/2}}(1-u_{app}(t)^2)e^{-u_{app}(t)^2} = V_{xX}(t) \quad (35)$$

$$\text{where } u_{app}(t)^2 = \frac{\mu_0\sigma_{app}(t)}{4}\frac{L^2}{t}$$

and $V_{xX}(t)$ on the right hand side is the measured voltage response of the coplanar tool. The longer the spacing, the larger the value t should be to apply the apparent conductivity concept from a single type of measurement (coplanar, single spacing). The $\sigma_{app}(t)$ should be constant and equal to the formation conductivity in a homogeneous formation: $\sigma_{app}(t)=\sigma$.

Apparent Conductivity from a Pair of Coaxial Tools

When there are two coaxial receivers, the ratio between the pair of voltage measurements is given by, $$\frac{V_{zZ}(L_1;t)}{V_{zZ}(L_2;t)} = e^{-\frac{\mu_0\sigma}{4t}(L_1^2-L_2^2)} \quad (36)$$

where $L_1$, and $L_2$ are transmitter-receiver spacing of two coaxial tools.

Conversely, the time-changing apparent conductivity is defined for a pair of coaxial tools by, $$\sigma_{app}(t) = \frac{-\ln\left(\frac{V_{zZ}(L_1;t)}{V_{zZ}(L_2;t)}\right)}{(L_1^2-L_2^2)}\frac{4t}{\mu_0} \quad (37)$$

at each time of measurement. The $\sigma_{app}(t)$ should be constant and equal to the formation conductivity in a homogeneous formation: $\sigma_{app}(t)=\sigma$.

The apparent conductivity is similarly defined for a pair of coplanar tools or for a pair of coaxial and coplanar tools. The $\sigma_{app}(t)$ should be constant and equal to the formation conductivity in a homogeneous formation: $\sigma_{app}(t)=\sigma$. The deviation from a constant $\sigma$ at time t suggests a conductivity anomaly in the region specified by time t.

Analysis of Coaxial Transient Response in Two Layer Models

To illustrate usefulness of the concept of apparent conductivity, the transient response of a tool in a two layer earth model can be examined. A coaxial tool with a transmitter-receiver spacing L may be placed in a horizontal well. Apparent conductivity $\sigma_{app}(t)$ reveals three parameters including: (1) the conductivity ($\sigma_B$=1 S/m) of a first layer in which the tool is placed; (2) the conductivity ($\sigma_S$=0.1 S/m) of an adjacent bed; and (3) The distance of the tool (horizontal borehole) to the layer boundary, d=1, 5, 10, 25, and 5 m.

Under a more general circumstance, the relative direction of a borehole and tool to the bed interface is not known. In the case of horizontal well logging, it's trivial to infer that the tool is parallel to the interface as the response does not change when the tool moves.

Figure 23:
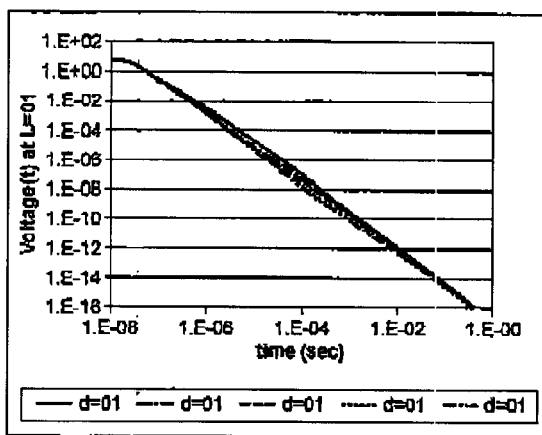
FIG. 23 is a plot showing the voltage response of the L-1 m transmitter-receiver offset coaxial tool at different distances.
Figure 24:
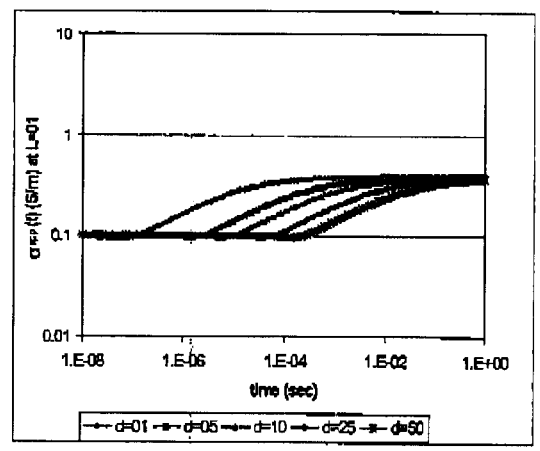
FIG. 24 is a plot showing the voltage data of FIG. 23 plotted in terms of apparent conductivity.

The voltage response of the L-1 m transmitter-receiver offset coaxial tool at different distances is shown in FIG. 23. Information can be derived from these responses using apparent conductivity as further explained with regard to FIG. 24. FIG. 24 shows the voltage data of FIG. 23 plotted in terms of apparent conductivity. The apparent conductivity plot shows conductivity at small t, conductivity at large t, and the transition time that moves as the distance (d) changes.

As will be further explained below, in a two layer resistivity profile, the apparent conductivity as t approaches zero can identify the layer conductivity around the tool, while the apparent conductivity as t approaches infinity can be used to determine the conductivity of the adjacent layer at a distance. The distance to a bed boundary from the tool can also be measured from the transition time observed in the apparent conductivity plot. The apparent conductivity plot for both time and tool location may be used as an image presentation of the transient data.

Conductivity at Small Values of t

At small values of t, the tool reads the apparent conductivity of the first layer around the tool. At large values of t, the tool reads 0.4 S/m, which is an average between the conductivities of the two layers. The change of distance d is reflected in the transition time.

Conductivity at small values of t is the conductivity of the local layer where the tool is located. At small values of t, the signal reaches the receiver directly from the transmitter without interfering with the bed boundary. Namely, the signal is affected only by the conductivity around the tool. Conversely, the layer conductivity can be measured easily by examining the apparent conductivity at small values of t.

Conductivity at Large Values of t

Conductivity at large values of t is some average of conductivities of both layers. At large values of t, nearly half of the signals come from the formation below the tool and the remaining signals come from above if the time to travel the distance of the tool to the bed boundary is small.

Figure 25:
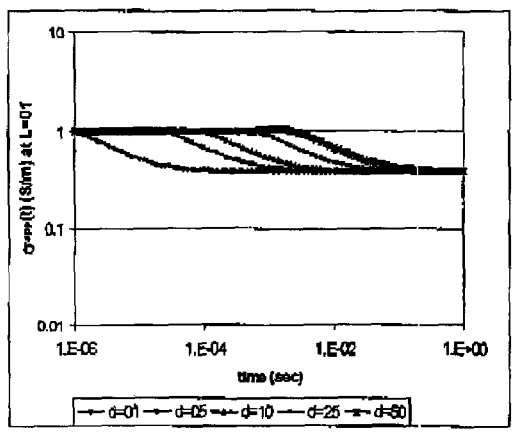
Figure 26:
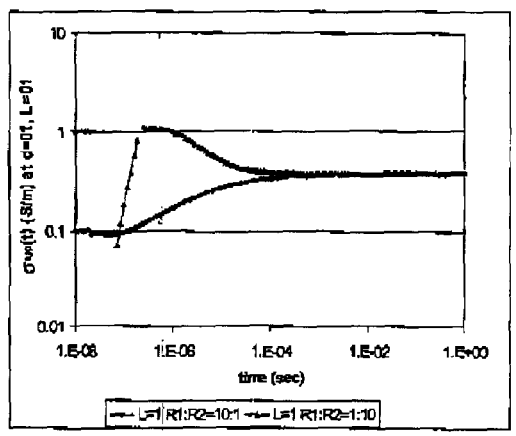
FIG. 26 is a plot comparing the $\sigma_{app}(t)$ plots of FIGS. 24 and 25 for L=1 m and d=1 m.

FIG. 26 compares the $\sigma_{app}(t)$ plot of FIGS. 24 and 25 for L=1 m and d=1 m. Though not shown, the conductivity at large values of t has a slight dependence on d. When the dependence is ignored, the conductivity at large values of t is determined solely by the conductivities of the two layers and is not affected by the location of the tool layer 1 or layer 2.

Figure 27:
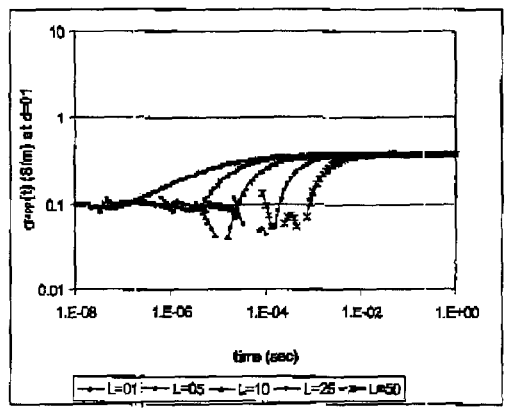
FIG. 27 is a plot comparing the $\sigma_{app}(t)$ plots for d=1 m but with different spacings L.

FIG. 27 compares the $\sigma_{app}(t)$ plots for d=1 m but with different spacings L. The $\sigma_{app}(t)$ reaches the nearly constant conductivity at large values of t as L increases. However, the conductivity at large values of t is almost independent of the spacing L for the range of d and the conductivities considered.

Figure 28:
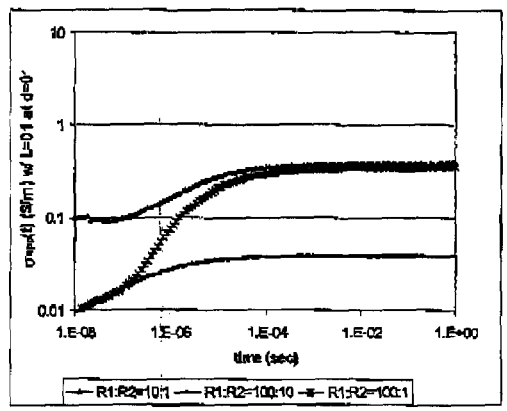
FIG. 28 is a plot comparing the $\sigma_{app}(t)$ plots for d=1 m and L=1 m but for different layer conductivities while the ratio between the two conductivities is kept fixed.

FIG. 28 compares the $\sigma_{app}(t)$ plots for d=1 m and L=1 m but for different layer coductivities while the ratio between the two conductivities kept fixed. FIG. 28 shows that the conductivity at large t scales with the layer conductivities. For instance:

$$\sigma_{app}(t \to \infty; R_1/R_2 = 10 \text{ ohm-m}, R_1 = 10 \text{ ohm-m}) = 10 \cdot \sigma_{app}(t \to \infty; R_1/R_2 = 10 \text{ ohm-m}, R_1 = 100 \text{ ohm-m}) \quad (38)$$

Figure 29:
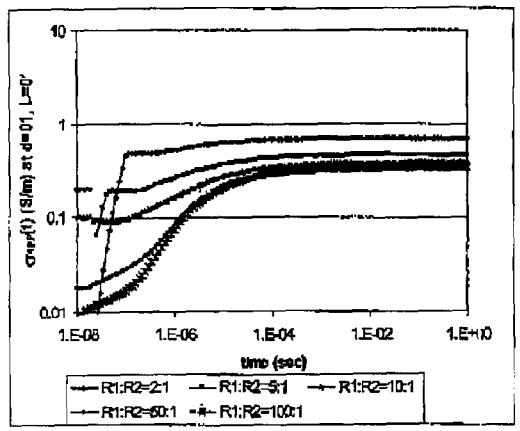
FIG. 29 is a plot showing examples of the $\sigma_{app}(t)$ plots for d=1 m and L=1 m but for different conductivities of the target layer 2 while the local conductivity is kept fixed at 1 S/M (1 ohm-m resistivity)
Figure 30:
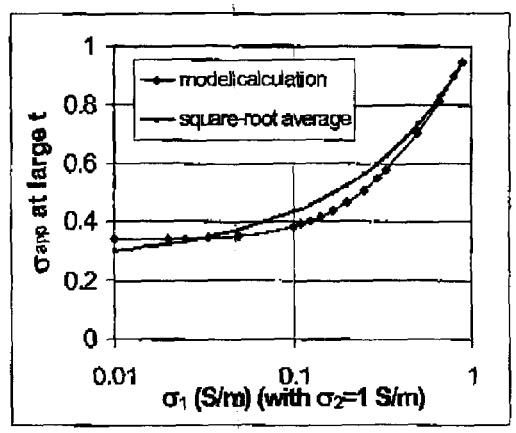
FIG. 30 is a plot showing the resistivity at large values of t as determined by the layer conductivity.

FIG. 29 shows examples of the $\sigma_{app}(t)$ plots for d=1 m and L=1 m but for different conductivities of the target layer 2 while the local conductivity is kept fixed at 1 S/m (1 ohm-m resistivity). The resistivity at large values of t is determined by the layer 2 conductivity as shown in FIG. 30.

Numerically, the late time conductivity may be approximated by the square root average of two layer conductivities as:

$$\sqrt{\sigma_{app}(t \to \infty; \sigma_1, \sigma_2)} = \frac{\sqrt{\sigma_1} + \sqrt{\sigma_2}}{2} \quad (39)$$

Figure 31:
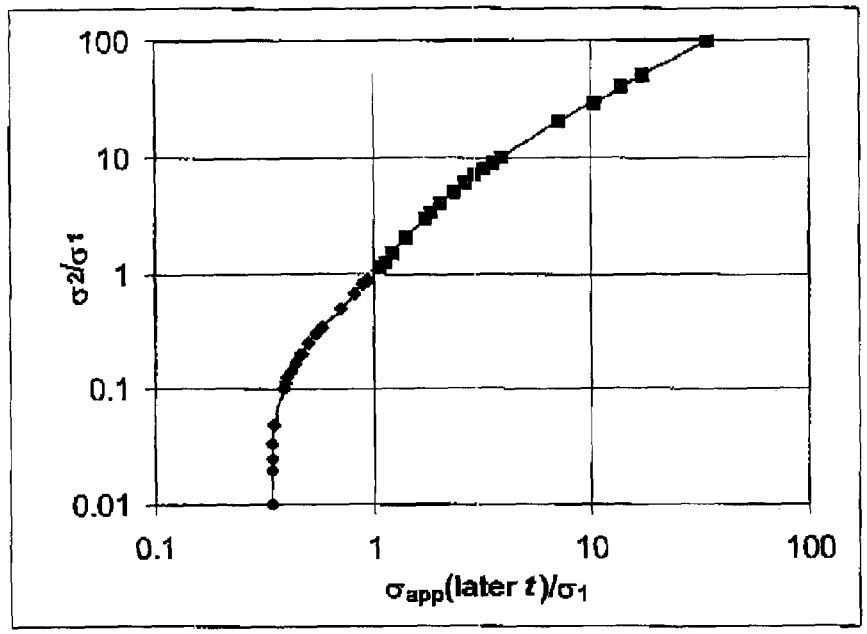
FIG. 31 is a plot showing that the conductivity at large values of t (as t approaches infinity) can be used to estimate the conductivity $\sigma_2$ of the adjacent layer when the local conductivity $\rho_1$ near the tool is known.

To summarize, the conductivity at large values of t (as t approaches infinity) can be used to estimate the conductivity $\sigma_2$ of the adjacent layer when the local conductivity $\sigma_1$ near the tool is known, for instance from the conductivity as t approaches 0 as illustrated in FIG. 31.

Estimation of d, the Distance to the Adjacent Bed

Figure 32:
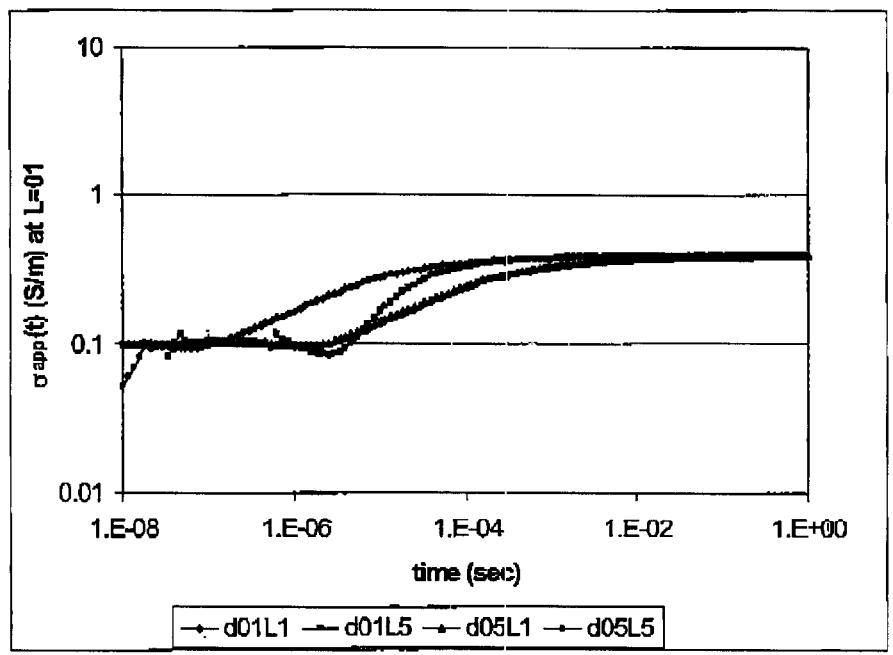
FIG. 32 is a plot showing that the transition time at which the apparent conductivity $\rho_{app}(t)$ starts deviating from the local conductivity $\sigma_1$ towards the conductivity at large values of t depends on d, the distance of the tool to the bed boundary.

The transition time at which the apparent conductivity $\sigma_{app}(t)$ starts deviating from the local conductivity $\sigma_1$ towards the conductivity at large values of t depends on d, the distance of the tool to the bed boundary, as shown in FIG. 32.

Figure 33:
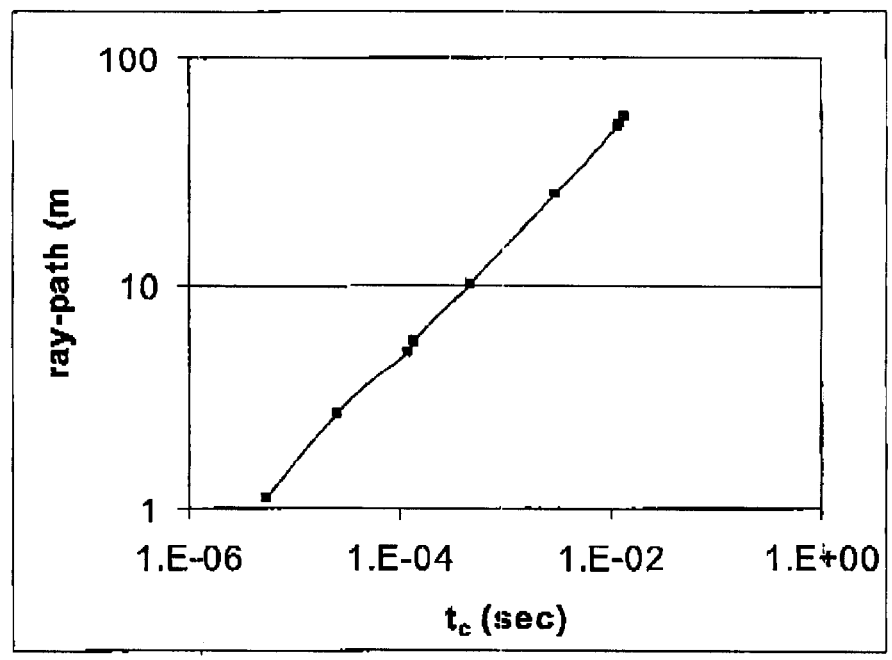
FIG. 33 is a plot showing that the distance d can be estimated from the transition time tc.

For convenience, the transition time $t_c$ can be defined as the time at which the $\sigma_{app} t_c$ takes the cutoff conductivity $\sigma_c$. In this case, the cutoff conductivity is represented by the arithmetic average between the conductivity as t approaches zero and the conductivity as t approaches infinity. The transition time ($t_c$) is dictated by the ray path:

$$\sqrt{\left(\frac{L}{2}\right)^2 + d^2}, \quad (40)$$

that is the shortest distance for the EM signal traveling from the transmitter to the bed boundary, to the receiver, independently of the resistivity of the two layers. Conversely, the distance d can be estimated from the transition time $t_c$, as shown in FIG. 33.

Other Uses of Apparent Conductivity

Similarly to conventional induction tools, the apparent conductivity $\sigma_{app}(z)$ is useful for analysis of the error in transient signal processing. The effect of the noise in transient response data may be examined as the error in the conductivity determination.

Figure 34:
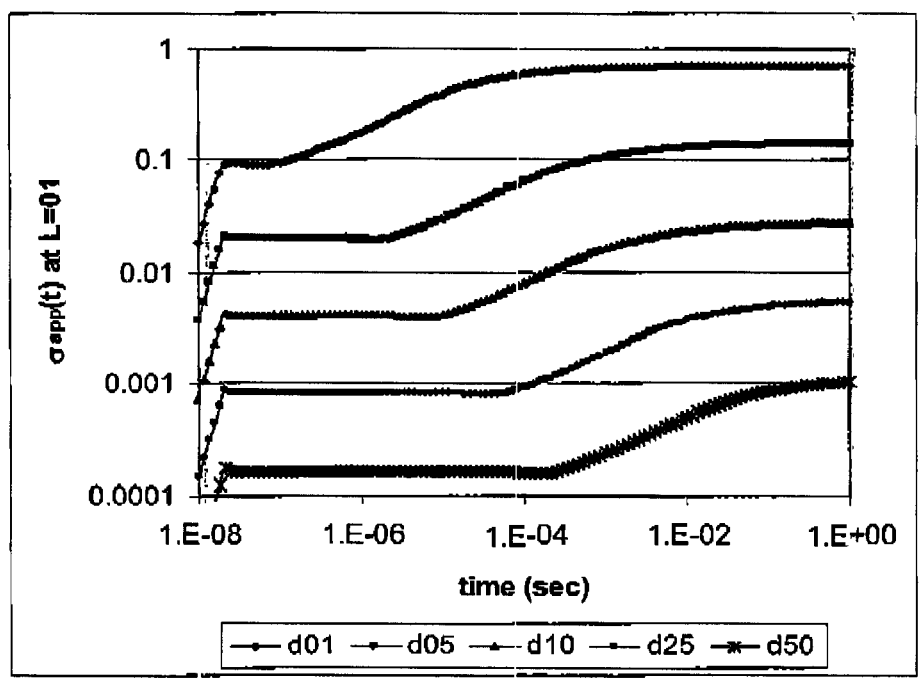
FIG. 34 is a plot showing that the apparent conductivity $\sigma_{app}(z,t)$ in both the z and t coordinates may serve as an image presentation of the transient data.

A plot of the apparent conductivity $\sigma_{app}(z;t)$ in both the z and t coordinates may serve as an image presentation of the transient data as shown in FIG. 34. The z coordinate references the tool location. The $\sigma_{app}(z;t)$ plot shows the approaching bed boundary as the tool moves along the borehole.

The apparent conductivity should be constant and equal to the formation conductivity in a homogeneous formation. The deviation from a constant conductivity value at time t suggests the presence of a conductivity anomaly in the region specified by time t.

In summary, the method allows real-time location of an anomaly in a borehole. The location of the anomaly is defined by its distance and direction from an origin. As demonstrated, the distance and direction can be determined based on magnetic field transient responses.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the claims.

We claim:

1. A method for locating an anomaly in a formation near a wellbore, in relation to a logging tool comprising at least one transmitter and at least one receiver, the method comprising:
    calculating at least one of an apparent conductivity of the formation and an apparent resistivity of the formation, over a selected time span based on a voltage response measured over time at the at least one receiver;
    determining a time at which the at least one of apparent conductivity and apparent resistivity deviates from a constant value; and ascertaining the anomaly in a region specified by the determined time.

2. The method of claim 1, further comprising measuring the voltage response in order to calculate the at least one of apparent conductivity and apparent resistivity.

3. The method of claim 1, further comprising selecting the time span based on a distance from the transmitter to the receiver.

4. The method of claim 3, further comprising selecting a longer time span as the transmitter to receiver spacing becomes larger.

5. The method of claim 1, further comprising calculating the apparent conductivity based on the measured voltage, the transmitter to receiver spacing, and a measurement time.

6. The method of claim 1, wherein the anomaly comprises a conductive anomaly.

7. The method of claim 1, wherein the anomaly comprises a resistive anomaly.

8. The method of claim 1, wherein the at least one of apparent conductivity of the formation and apparent resistivity of the formation is calculated as a function of time.

9. A computer readable medium for storing computer executable instruction for performing the method of claim 1.

10. A method for locating an anomaly in a formation near a wellbore, in relation to a tool comprising at least one transmitter and at least one receiver, the method comprising:
   measuring a transient response at the at least one receiver;
   calculating at least one of an apparent conductivity of the formation and an apparent resistivity of the formation, as a function of time based on the transient response; and
   locating the anomaly based on variation of the at least one of apparent conductivity and apparent resistivity over time.

11. The method of claim 10, wherein the response is a voltage response.

12. The method of claim 10, wherein the response is a transient response.

13. The method of claim 10, wherein the at least one of an apparent conductivity of the formation and an apparent resistivity is calculated as function of time following a sudden change in a transmitter current.

14. The method of claim 10, wherein the at least one of an apparent conductivity of the formation and an apparent resistivity is calculated as function of time following termination of a transmitter current.

15. The method of claim 10, wherein locating the anomaly comprises determining a distance from the tool to the anomaly.

16. A system for determining a distance to an anomaly in a formation near a wellbore, the system comprising:
   a tool with at least one transmitter and at least one receiver;
   a computer readable medium storing instructions for calculating at least one of an apparent conductivity of the formation and an apparent resistivity of the formation, as a function of time based on a transient signal measured at the receiver in response to a signal transmitted by the transmitter, and
   determining the distance from the tool to the anomaly based on variation of the at least one of apparent conductivity and apparent resistivity as indicated by the transient signal.

17. The system of claim 16, wherein the instructions are computer executable.

* * * * *